United States Patent
Kwak et al.

(10) Patent No.: US 10,742,457 B2
(45) Date of Patent: Aug. 11, 2020

(54) INITIALIZATION OF PSEUDO NOISE SEQUENCES FOR REFERENCE SIGNALS AND DATA SCRAMBLING

(71) Applicant: Intel IP Corporation, Santa Clara, CA (US)

(72) Inventors: Yongjun Kwak, Portland, OR (US);
Avik Sengupta, San Jose, CA (US);
Dae Won Lee, Portland, OR (US);
Alexei Davydov, Nizhny Novgorod (RU); Seunghee Han, San Jose, CA (US); Gregory Morozov, Nizhny Novgorod (RU); Sameer Pawar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/127,829

(22) Filed: Sep. 11, 2018

(65) Prior Publication Data

US 2019/0044761 A1    Feb. 7, 2019

Related U.S. Application Data

(60) Provisional application No. 62/556,976, filed on Sep. 11, 2017, provisional application No. 62/567,022,
(Continued)

(51) Int. Cl.
*H04L 25/03* (2006.01)
*H04L 27/26* (2006.01)
(Continued)

(52) U.S. Cl.
CPC ...... *H04L 25/03866* (2013.01); *H03M 13/09* (2013.01); *H04J 13/0022* (2013.01);
(Continued)

(58) Field of Classification Search
CPC . H04L 25/03866; H04L 27/2613; H04L 9/06;
H04L 5/0048; H04W 72/042
See application file for complete search history.

(56) References Cited

U.S. PATENT DOCUMENTS

| 6,456,612 B1* | 9/2002 | Kim | H03K 3/84 370/206 |
| 6,542,478 B1* | 4/2003 | Park | H04B 1/707 370/308 |

(Continued)

OTHER PUBLICATIONS

He et al., Primary Synchronization Signal Design for New Radio Technique in 5G Communication System, Jul. 14, 2017, Mobimedia '17. (Year: 2017).*

*Primary Examiner* — Rasheed Gidado
(74) *Attorney, Agent, or Firm* — Kowert, Hood, Munyon, Rankin & Goetzel, P.C.

(57) ABSTRACT

Embodiments of the present disclosure describe apparatuses, systems, and methods for initialization of pseudo noise (PN) sequences for reference signals and data scrambling. Some embodiments may be to initialize the first M-sequence of the PN sequence with a fixed value; and initialize the second M-sequence of the PN sequence with a compressed value. Some embodiments may be to initialize the first M-sequence of the PN sequence with a fixed value; initialize the second M-sequence of the PN sequence with a part of the initialization parameters; and shift the PN sequence by another part of the initialization parameters. Some embodiments may be to initialize the first M-sequence of the PN sequence with a part of the initialization parameters; and initialize the second M-sequence of the PN sequence with another part of the initialization parameters. The embodiments may lead to a more efficient hardware design.

23 Claims, 17 Drawing Sheets

Related U.S. Application Data filed on Oct. 2, 2017, provisional application No. 62/587,699, filed on Nov. 17, 2017.

(51) Int. Cl.

| | |
|---|---|
| *H04L 5/00* | (2006.01) |
| *H04L 9/06* | (2006.01) |
| *H03M 13/09* | (2006.01) |
| *H04J 13/10* | (2011.01) |
| *H04J 13/00* | (2011.01) |
| *H04W 72/04* | (2009.01) |

(52) U.S. Cl.
CPC ............... *H04J 13/10* (2013.01); *H04L 9/06* (2013.01); *H04L 9/0662* (2013.01); *H04L 27/2613* (2013.01); *H04L 5/001* (2013.01); *H04L 5/0048* (2013.01); *H04L 2209/34* (2013.01); *H04L 2209/805* (2013.01); *H04W 72/042* (2013.01)

(56) References Cited

U.S. PATENT DOCUMENTS

| | | | |
|---|---|---|---|
| 10,411,940 B2* | 9/2019 | Ko | H04W 72/04 |
| 2010/0027473 A1* | 2/2010 | Ghosh | H04L 27/2613 370/328 |
| 2014/0192768 A1* | 7/2014 | Yeh | H04B 7/0469 370/330 |
| 2014/0293943 A1* | 10/2014 | Yoon | H04L 5/0091 370/329 |
| 2018/0324732 A1* | 11/2018 | Park | H04W 56/0015 |
| 2019/0116076 A1* | 4/2019 | Li | H04J 13/10 |

* cited by examiner

INITIALIZATION OF PSEUDO NOISE SEQUENCES FOR REFERENCE SIGNALS AND DATA SCRAMBLING

CROSS REFERENCE TO RELATED APPLICATIONS

This application claims priority under 35 U.S.C. § 119(e) to U.S. Provisional Patent Application No. 62/556,976 entitled "Initialization of Pseudo-Random Code for Reference Signals and Data Scrambling" filed Sep. 11, 2017, the disclosure of which is incorporated herein by reference; U.S. Provisional Patent Application No. 62/567,022 entitled "Initialization of Pseudo-Random Code for Reference Signals and Data Scrambling" filed Oct. 2, 2017, the disclosure of which is incorporated herein by reference; and U.S. Provisional Patent Application No. 62/587,699 entitled "Initialization of Pseudo-Random Code for Reference Signals and Data Scrambling" filed Nov. 17, 2017, the disclosure of which is incorporated herein by reference.

FIELD

Embodiments of the present disclosure generally relate to the field of wireless communications, and more particularly, to apparatuses, systems, and methods for initialization of pseudo noise (PN) sequences for reference signals and data scrambling.

BACKGROUND

In 3GPP Long-Term Evolution (LTE) protocols, reference signals (RSs), such as demodulation reference signal (DMRS), Cell-specific reference signal (RS) (CRS), Channel State Information RS (CSI-RS), Positioning RS (PRS) and other reference signals, are based on PN sequences which are extracted from a long Gold sequence. Furthermore, data scrambling is performed with the same long Gold sequence.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 9A illustrates an example generation of a PN sequence with frequency-first mapping; and FIG. 9B illustrates an example generation of a PN sequence with time-first mapping.

DETAILED DESCRIPTION

Figure 1:
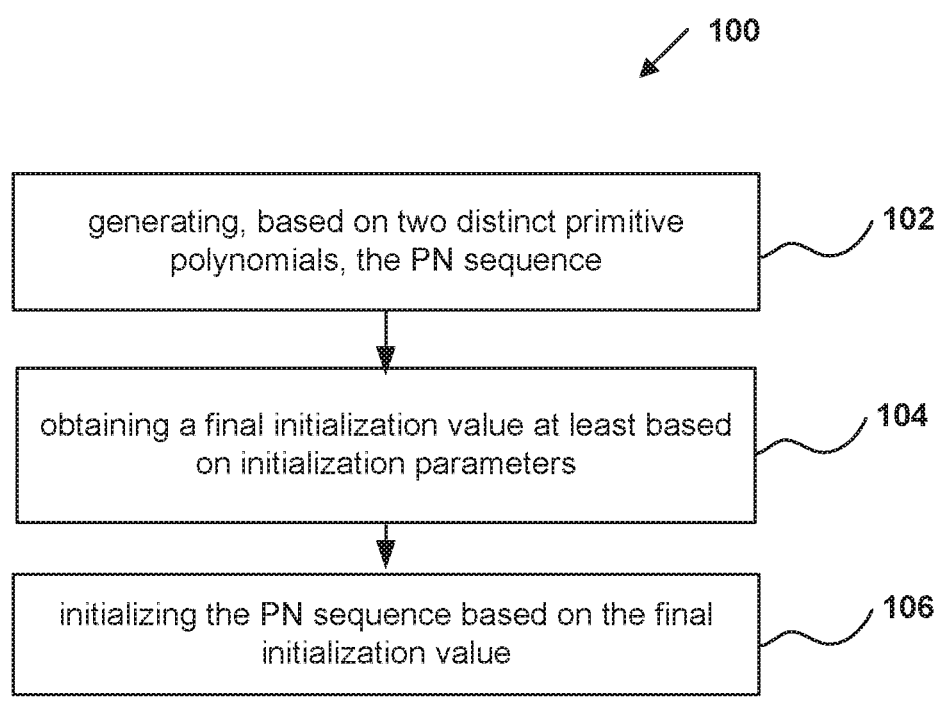
FIG. 1 illustrates an example operation flow/algorithmic structure of an apparatus according to some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and processes are omitted so as not to obscure the description of the various embodiments with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments", "in some embodiments", and the like are used repeatedly. The phrase generally does not refer to the same embodiments; however, it may. The terms "comprising", "having", and "including" are synonymous, unless the context dictates otherwise. The phrase "A or B" means (A), (B), or (A and B).

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional operations not included in the figure(s). A process may correspond to a method, a function, a procedure, a subroutine, a subprogram, and the like. When a process corresponds to a function, its termination may correspond to a return of the function to the calling function and/or the main function.

As used herein, the term "processor circuitry" refers to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program codes, software modules, and/or functional processes. As used herein, the term "interface circuitry" refers to, is part of, or includes circuitry providing for the exchange of information between two or more components or devices. The term "interface circuitry" may refer to one or more hardware interfaces (for example, buses, input/output (I/O) interfaces, peripheral component interfaces, and the like).

As used herein, the term "user equipment" or "UE" may be considered synonymous to, and may hereafter be occasionally referred to, as a client, mobile, mobile device, mobile terminal, user terminal, mobile unit, mobile station, mobile user, subscriber, user, remote station, access agent, user agent, receiver, etc., and may describe a remote user of network resources in a communications network. Furthermore, the term "user equipment" or "UE" may include any type of wireless/wired device such as consumer electronics devices, cellular phones, smartphones, tablet personal computers, Internet of Things ("IoT") devices, smart sensors, wearable computing devices, personal digital assistants (PDAs), desktop computers, and laptop computers, for example.

As used herein, the term "base station" may be considered synonymous to, and may hereafter be occasionally referred to, as access nodes (ANs) can be referred to as base stations (BSs), NodeBs, evolved NodeBs (eNBs), next Generation NodeBs (gNB), radio access node (RAN) nodes, and so forth, and may comprise ground stations (e.g., terrestrial access points) or satellite stations providing coverage within a geographic area (e.g., a cell). A base station may be a device that is consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol or a protocol that is consistent with other existing generations, generations in development or to be developed in the future (e.g., second generation (2G), sixth generation (6G), etc.), a New Radio (NR) protocol, and the like.

In 3GPP LTE protocols, RSs, such as DMRS, CRS, CSI-RS, PRS and other RSs, are based on PN sequences which are extracted from a long Gold sequence. Furthermore, data scrambling is performed with the same long Gold sequence.

This Gold sequence is generated using two primitive polynomials of order 31, $g_0(x)=x^{31}+x^3+1$ and $g_1(x)=x^{31}+x^3+x^2+x+1$. The PN sequence expression is as follows:

$$c(n)=(x_0(n+N_c)+x_1(n+N_c)) \bmod 2.$$

Here c(n) is the Gold sequence (n=0, 1, ... , $M_{PN}$−1, where $M_{PN}$ is the length of the output sequence), $x_0$ and $x_1$ are two constituent maximum length sequences (M-sequences) obtained using the polynomials $g_0(x)$ and $g_1(x)$, respectively, i.e.:

$$x_0(n+31)=(x_0(n+3)+x_0(n)) \bmod 2;$$

$$x_1(n+31)=(x_1(n+3)+x_1(n+2)+x_1(n+1)+x_1(n)) \bmod 2.$$

$N_c$ is the initial offset, and in LTE it equals to 1600.

The initial states of linear feedback shift registers (LFSRs) generating the constituent M-sequences are defined as follows:

$$x_0(0)=1, x_0(k)=0, k=1,2, \ldots ,30;$$

$$x_1(k)=\lfloor c_{init}/2^k \rfloor \bmod 2, k=0,1, \ldots ,30.$$

Here $c_{init}$ is the initialization value which may be based on the cell identity (Cell-ID), the orthogonal frequency-division multiplexing (OFDM) symbol index, etc.

In the equations above, (●) mod 2 corresponds to the modulo-2 operation and ⌊●⌋ corresponds to the floor operation (i.e., obtaining the nearest integer lower than the argument).

Given that devices that support 5G NR systems will also likely support LTE systems to provide better network coverage, it may be beneficial in reusing the PN sequence used for LTE systems in NR systems, which may lead to a more efficient hardware design.

However, direct usage of the LTE PN sequence for NR systems may lead to issues in initialization value configuration. Most notably, the initialization value for NR systems may exceed 31 bits of an initial state shift register for an LTE Gold sequence of length 31.

Tables 1-4 show example comparisons of the number of bits for initialization of the PN sequences for various applications in LTE systems and in NR systems.

In tables 1-4, the following abbreviations apply:
CP Cyclic Prefix
CRS Cell-specific reference signal
CSI Channel state information
CSI-RS CSI reference signal
DMRS Demodulation reference signal
ID Identity
MBMS Multimedia broadcast/multicast service
MBSFN Multicast broadcast single frequency network
OFDM Orthogonal frequency-division multiplexing
PDSCH Physical downlink shared channel
PMCH Physical multicast channel
PRS Positioning Reference signal
PUSCH Physical uplink shared channel
RNTI Radio network temporary identifier
SCID Scrambling identity
UE User equipment

TABLE 1

Comparison for Bit Scrambling

| LTE | [NR] estimates |
|---|---|
| LTE PUSCH/PDSCH Bit Scrambling | NR PUSCH/PDSCH Bit Scrambling |
| 30 bits $c_{init} = \underbrace{\dfrac{n_{RNTI} \cdot 2^{14}}{16 \text{ bits}}}_{} + \underbrace{\dfrac{q \cdot 2^{13}}{1 \text{ bit}}}_{} + \underbrace{\dfrac{\lfloor n_s/2 \rfloor \cdot 2^9}{4 \text{ bits}}}_{} + \underbrace{\dfrac{N_{ID}^{cell}}{9 \text{ bits}}}_{}$ | 35 bits $c_{init} = \underbrace{\dfrac{n_{RNTI} \cdot 2^{19}}{16 \text{ bits}}}_{} + \underbrace{\dfrac{q \cdot 2^{18}}{1 \text{ bit}}}_{} + \underbrace{\dfrac{n_s \cdot 2^{10}}{8 \text{ bits}}}_{} + \underbrace{\dfrac{N_{ID}^{cell}}{10 \text{ bits}}}_{}$ |
| LTE PMCH Bit Scrambling | NR PMCH Bit Scrambling |
| 12 bits $c_{init} = \underbrace{\dfrac{\lfloor n_s/2 \rfloor \cdot 2^9}{4 \text{ bits}}}_{} + \underbrace{\dfrac{N_{ID}^{MBSFN}}{8 \text{ bits}}}_{}$ | 16 bits $c_{init} = \underbrace{\dfrac{n_s \cdot 2^9}{8 \text{ bits}}}_{} + \underbrace{\dfrac{N_{ID}^{MBSFN}}{8 \text{ bits}}}_{}$ |

LTE Notes:
$N_{ID}^{cell}$: cell ID: 0~503 (9 bits) $N_{ID}^{MBSFN}$: MBMS ID: 0~255 (8 bits) $n_{RNTI}$: 16 bits $n_s/2$: Subframe index: 0~9 (4 bits) q: Codeword index: 0~1 (1 bit)
NR Notes:
$N_{ID}^{cell}$: cell ID: 0~1007 (10 bits) $N_{ID}^{MBSFN}$: MBMS ID: 0~255 (8 bits) $n_{RNTI}$: 16 bits $n_s$: slot index: 0~159 (8 bits) q: Codeword index: 0~1 (1 bit)

TABLE 2

Comparison for CRS/CSI-RS/PRS/MBSFN-RS

| LTE | [NR] estimates |
|---|---|
| LTE CRS/CSI-RS/Positioning (Rel-9) | NR CSI-RS |
| 28 bits  For CSI-RS: $N_{ID}^{cell} \Rightarrow N_{ID}^{CSI}$ | 34 bits  For CSI-RS: $N_{ID}^{cell} \Rightarrow N_{ID}^{CSI}$ |
| $c_{init} = \underbrace{\dfrac{2^{10} \cdot (7 \cdot (n_s + 1) + l + 1) \cdot (2 \cdot N_{ID}^{cell} + 1)}{8 \sim 148029 = 18 \text{ bits}}}_{} + \underbrace{\dfrac{2 \cdot N_{ID}^{cell}}{9 \text{ bits}}}_{} + \underbrace{\dfrac{N_{CP}}{1 \text{ bit}}}_{}$ | $c_{init} = \underbrace{\dfrac{2^{11} \cdot (14 \cdot (n_s + 1) + l + 1) \cdot (2 \cdot N_{ID}^{cell} + 1)}{15 \sim 4546318 = 23 \text{ bits}}}_{} + \underbrace{\dfrac{2 \cdot N_{ID}^{cell}}{10 \text{ bits}}}_{} + \underbrace{\dfrac{N_{CP}}{1 \text{ bit}}}_{}$ |
| LTE MBSFN-RS | NR MBSFN-RS |
| 25 bits | 29 bits |
| $c_{init} = \underbrace{\dfrac{2^9 \cdot (7 \cdot (n_s + 1) + l + 1) \cdot (2 \cdot N_{ID}^{MBSFN} + 1)}{8 \sim 75117 = 17 \text{ bits}}}_{} + \underbrace{\dfrac{N_{ID}^{MBSFN}}{8 \text{ bits}}}_{}$ | $c_{init} = \underbrace{\dfrac{2^9 \cdot (14 \cdot (n_s + 1) + l + 1) \cdot (2 \cdot N_{ID}^{MBSFN} + 1)}{15 \sim 1151794 = 21 \text{ bits}}}_{} + \underbrace{\dfrac{N_{ID}^{MBSFN}}{8 \text{ bits}}}_{}$ |

LTE Notes:
$N_{ID}^{cell}$: cell ID, 0~503 (9 bits) $N_{ID}^{MBSFN}$: MBMS ID: 0~255 (8 bits) $N_{CP}$: CP length, 0 or 1 (1 bit) $n_s$: slot index, 0~19 l: ODFM symbol index, 0~6
NR Notes:
$N_{ID}^{cell}$: cell ID: 0~1007 (10 bits) $N_{ID}^{MBSFN}$: MBMS ID: 0~255 (8 bits) $N_{CP}$: CP length, 0 or 1 (1 bit) $n_s$: slot index: 0~159 l: OFDM symbol index, 0~13

TABLE 3

Comparison for PRS

| LTE | [NR] estimates |
|---|---|
| LTE Positioning (Rel-14) | NR Positioning RS |
| 31 bits | 40 bits |
| $c_{init} = \underbrace{\dfrac{2^{28} \cdot \lfloor N_{ID}^{PRS}/512 \rfloor}{3 \text{ bits}}}_{} + \underbrace{\dfrac{2^{10} \cdot (7 \cdot (n_s + 1) + l + 1) \cdot (2 \cdot (N_{ID}^{PRS} \bmod 512) + 1)}{8 \sim 148029 = 18 \text{ bits}}}_{} + \underbrace{\dfrac{2 \cdot (N_{ID}^{PRS} \bmod 512)}{9 \text{ bits}}}_{} + \underbrace{\dfrac{N_{CP}}{1 \text{ bit}}}_{}$ | $c_{init} = \underbrace{\dfrac{2^{14} \cdot (14 \cdot (n_s + 1) + l + 1) \cdot (2 \cdot N_{ID}^{PRS} + 1)}{15 \sim 34633662 = 26 \text{ bits}}}_{} + \underbrace{\dfrac{2 \cdot N_{ID}^{PRS}}{13 \text{ bits}}}_{} + \underbrace{\dfrac{N_{CP}}{1 \text{ bit}}}_{}$ |

LTE Notes:
$N_{ID}^{cell}$: cell ID, 0~503 (9 bits) $N_{ID}^{PRS}$: positioning ID: 0~4095 $N_{CP}$: CP length, 0 or 1 (1 bit) $n_s$: slot index, 0~19 l: OFDM symbol index, 0~6
NR Notes:
$N_{ID}^{cell}$: cell ID: 0~1007 (10 bits) $N_{ID}^{PRS}$: positioning ID: 0~8191 $N_{CP}$: CP length, 0 or 1 (1 bit) $n_s$: slot index: 0~159 l: OFDM symbol index, 0~13

TABLE 4

Comparison for DMRS

| LTE | [NR] estimates |
|---|---|
| LTE DMRS Port 5 | NR DMRS |
| 30 bits $c_{init} = \dfrac{(\lfloor n_s/2 \rfloor + 1) \cdot (2 \cdot N_{ID}^{cell} + 1) \cdot 2^{16}}{8 \sim 148029 = 14 \text{ bits}} + \dfrac{n_{RNTI}}{16 \text{ bits}}$ | 20 bits $c_{init} = \dfrac{(n_s + 1) \cdot (2 \cdot n_{ID}^{(n_{SCID})} + 1) \cdot 2^{16}}{1 \sim 322720 = 19 \text{ bits}} + \dfrac{n_{SCID}}{1 \text{ bit}}$ |
| LTE DMRS Port 7~14 | |
| 15 bits $c_{init} = \dfrac{(\lfloor n_s/2 \rfloor + 1) \cdot (2 \cdot n_{ID}^{(n_{SCID})} + 1) \cdot 2^{16}}{8 \sim 148029 = 14 \text{ bits}} + \dfrac{n_{SCID}}{1 \text{ bits}}$ | |

LTE Notes:
$N_{ID}^{cell}$: cell ID, 0~503 (9 bits) $n_{RNTI}$: UE ID (16 bits) $n_{ID}^{(i)}$: $N_{ID}^{cell}$ or $N_{ID}^{DMRS,i}$ (9 bits) $n_{SCID}$: 0 or 1 (1 bit) $n_s/2$: subframe index, 0~9
NR Notes:
$N_{ID}^{cell}$: cell ID: 0~1008 (10 bits) $n_{RNTI}$: UE ID (16 bits) $n_{ID}^{(i)}$: $N_{ID}^{cell}$ or $N_{ID}^{DMRS,i}$ (10 bits) $n_{SCID}$: 0 or 1 (1 bit) $n_s$: subframe index, 0~159

The number of bits for initialization of PN sequences for various applications in NR systems may be estimated based on the assumption that the LTE formulation for initialization of corresponding PN sequences may be reused as a guideline for the NR systems. The increase in the number of bits for initialization of PN sequences in the NR systems comes from the fact that the NR systems have a larger number of cell-IDs and a larger number of slots within a radio frame of 10 msec.

The lack of bits to represent the initialization value for NR systems generally stems from the jointly non-linear component of the initialization value. An example of the jointly non-linear component of the initialization value is a multiplication of an OFDM symbol index within a radio frame and a cell-ID in a PRS, e.g., $(14*(n_s+1)+l+1)*(2*N_{ID}^{cell}+1)$. This component may be used to provide randomization of the high partial cross correlation effect between cells over time instances. Because of the multiplicative nature of the jointly non-linear component, the jointly non-linear component can grow significantly if the number of OFDM symbols within a radio frame and the number of cell-IDs increase.

Embodiments of the present disclosure may be directed to an apparatus and a method for providing PN sequences for reference signals and scrambling codes for NR systems while re-using the LTE length-31 PN sequence.

FIG. 1 illustrates an example operation flow/algorithmic structure 100 of an apparatus according to some embodiments.

Operation flow/algorithmic structure 100 may include, at 102, generating, based on two distinct primitive polynomials, the PN sequence, wherein the PN sequence is defined by a first M-sequence and a second M-sequence. In an embodiment, operation flow/algorithmic structure 100 may further include receiving the two distinct primitive polynomials from a memory.

Operation flow/algorithmic structure 100 may further include, at 104, obtaining a final initialization value at least based on initialization parameters, wherein the final initialization value has a length smaller than or equal to that for initializing a corresponding PN sequence to be used in an LTE system. In an embodiment, operation flow/algorithmic structure 100 may further include receiving the initialization parameters from a memory.

Operation flow/algorithmic structure 100 may further include, at 106, initializing the PN sequence based on the final initialization value.

Embodiments for avoiding a long initialization value for a length-31 PN sequence in an NR system are discussed below. Some embodiments may be to transform the long initialization value into a compressed value, initialize the first M-sequence of the PN sequence with a fixed value; and initialize the second M-sequence of the PN sequence with the compressed value. Some embodiments may be to break down the long initialization value into parameter components, use a fixed value to initialize the first M-sequence of the PN sequence, use some parameter components to initialize the second M-sequence of the PN sequence, and use other parameter components to perform a shift of the output sequence. Some embodiments may be to break down the long initialization value into parameter components, use some parameter components to initialize the first M-sequence of the PN sequence, and use other parameter components to initialize the second M-sequence of the PN sequence.

According to some embodiments, the long initialization value may be compressed within 31 bits available for a PN sequence generator.

Figure 2:
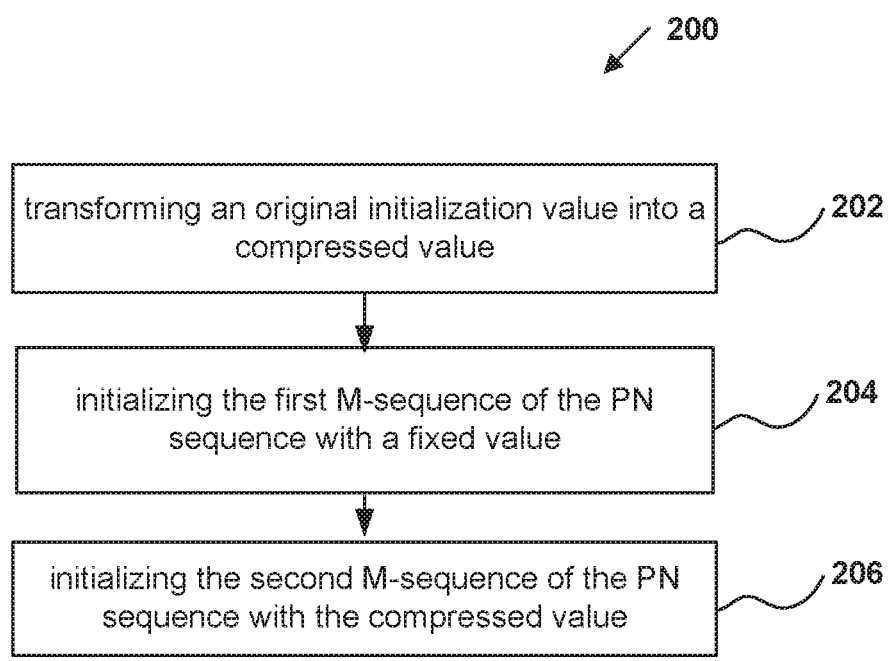
FIG. 2 illustrates another example operation flow/algorithmic structure of an apparatus according to some embodiments.

FIG. 2 illustrates an example operation flow/algorithmic structure 200 of an apparatus according to some embodiments.

Operation flow/algorithmic structure 200 may include, at 202, transforming an original initialization value into a compressed value, wherein the original initialization value is derived based on the initialization parameters and has a length larger than that for initializing a corresponding PN sequence to be used in the LTE system. In an embodiment, operation flow/algorithmic structure 200 may include using a hashing function to transform the original initialization value into the compressed value.

Operation flow/algorithmic structure 200 may further include, at 204, initializing the first M-sequence of the PN sequence with a fixed value.

Operation flow/algorithmic structure 200 may further include, at 206, initializing the second M-sequence of the PN sequence with the compressed value.

In an embodiment, the long initialization value of a PN sequence may be inserted into a hashing function and the PN sequence may be initialized with the result of the hashing function.

In an embodiment, the N-bit original initialization value for the PN sequence may be first fed into the hashing function to generate a length-M bit sequence, where N is larger than M. The M-bit sequence may be then used to initialize the second M-sequence of the PN sequence.

In an embodiment, the hashing function for the PN sequence initialization may take in an input value that may be represented by N bits and may output a value that may be represented by M bits, where N is larger than 31 and M is smaller than or equal to 31.

Figure 3:
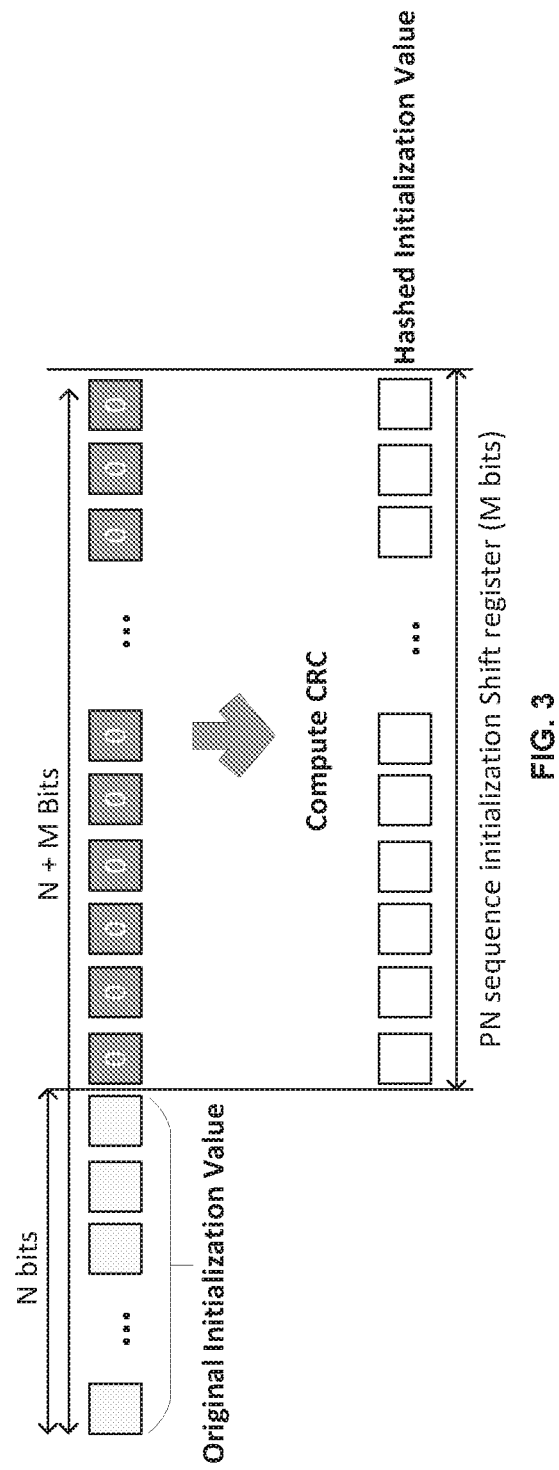
FIG. 3 illustrates an example initialization of a PN sequence according to some embodiments.

One example of such a hashing function is a cyclic redundancy check (CRC) calculation function. FIG. 3 illustrates an example of computing, by a PN sequence initialization shift register of M bits, the CRC of the original initialization value as the hashed initialization value. Regardless of the bit length of N, the resultant CRC length may be equal to the CRC polynomial order minus 1. Table 5 shows potential CRC polynomials that may be suitable for hashing the original initialization value of the PN sequence.

TABLE 5

Potential CRC polynomials

| | |
|---|---|
| CRC length of 31 | $g(x) = x^{31} + x^3 + 1$ |
| | $g(x) = x^{31} + x^3 + x^2 + x + 1$ |
| | $g(x) = x^{31} + x^{13} + x^8 + x^3 + 1$ |
| | $g(x) = x^{31} + x^{16} + x^8 + x^4 + x^3 + x^2 + 1$ |
| | $g(x) = x^{31} + x^{20} + x^{15} + x^5 + x^4 + x^3 + 1$ |
| | $g(x) = x^{31} + x^{20} + x^{18} + x^7 + x^5 + x3 + 1$ |
| | $g(x) = x^{31} + x^{21} + x^{12} + x^3 + x^2 + x + 1$ |
| | $g(x) = x^{31} + x^{23} + x^{22} + x^{15} + x^{14} + x^7 + x^4 + x^3 + 1$ |
| | $g(x) = x^{31} + x^{25} + x^{19} + x^{14} + x^7 + x^3 + x^2 + x + 1$ |
| | $g(x) = x^{31} + x^{27} + x^{23} + x^{19} + x^{15} + x^{11} + x^7 + x^3 + 1$ |
| | $g(x) = x^{31} + x^{27} + x^{23} + x^{19} + x^{15} + x^{11} + x^{10} + x^9 + x^7 + x^6 + x^5 + x^3 + x^2 + x + 1$ |
| CRC length of 24 | $g(x) = x^{24} + x^{24} + x^{18} + x^{17} + x^{14} + x^{11} + x^{10} + x^7 + x^6 + x^5 + x^4 + x^3 + x + 1$ |
| | $g(x) = x^{24} + x^{23} + x^6 + x^5 + x1 + 1$ |
| | $g(x) = x^{24} + x^{23} + x^{21} + x^{20} + x^{17} + x^{15} + x^{13} + x^{12} + x^8 + x^4 + x^2 + x + 1$ |
| CRC length of 16 | $g(x) = x^{16} + x^{12} + x^5 + x + 1$ |

As shown in Table 5, CRC length of 31 refers to the CRC polynomials with highest polynomial order of 31, CRC length of 24 refers to the CRC polynomials with highest polynomial order of 24 and CRC length of 16 refers to the CRC polynomials with highest polynomial order of 16.

Another example of the hashing function is a cyclic wrap around function. In an embodiment, if the input bits of the PN sequence initialization value exceed binary representation of 31 bits, the value exceeding the binary representation of 31 bits is taken, down shifted by $2^{31}$ and combined with the original initialization value.

Figure 4:
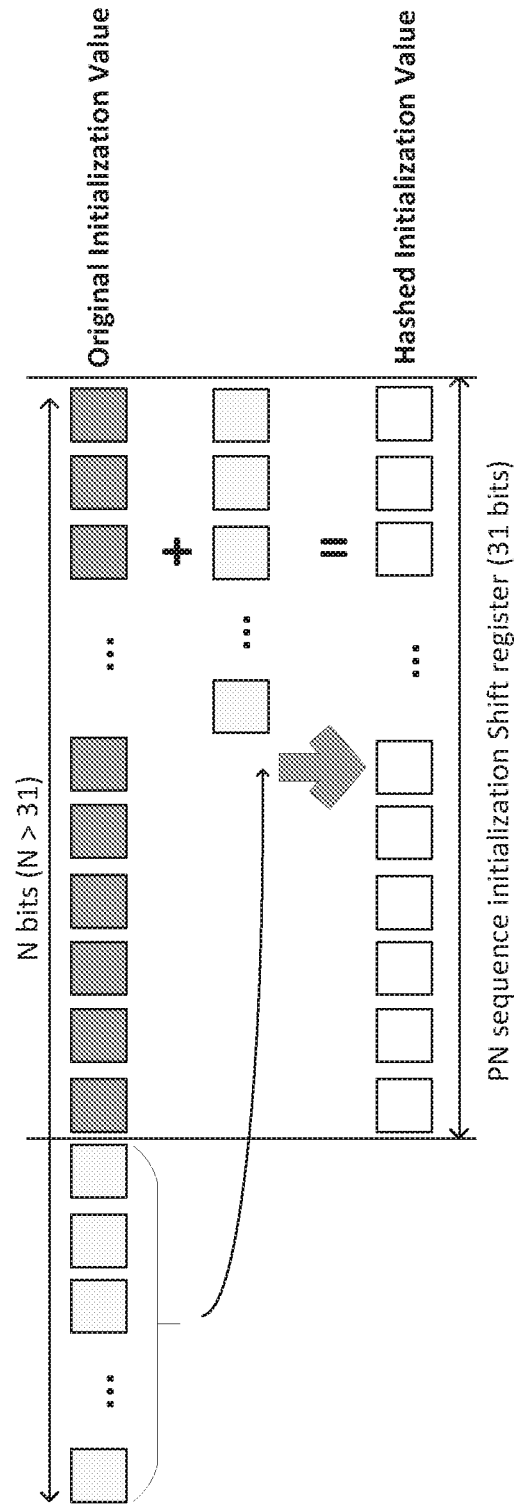
FIG. 4 illustrates another example initialization of a PN sequence according to some embodiments.

The cyclic wrap around function can be implemented in two ways. FIG. 4 illustrates an example of implementing, in a PN sequence initialization shift register of 31 bits, the cyclic wrap around function in the first way. As shown in FIG. 4, the value larger than $2^{31}$ is added back to the original initialization value composed of N bits (31<N<62) and the modulo-$2^{31}$ operation is performed on the sum so as to obtain the final hashing output. The hashing function can be represented as:

$$c_{init} = (z + \lfloor z/2^{31} \rfloor) \bmod 2^{31},$$

wherein "z" is the original initialization value, and $c_{init}$ is the final hashing output which will be used to initialize the second M-sequence of the PN sequence.

Figure 5:
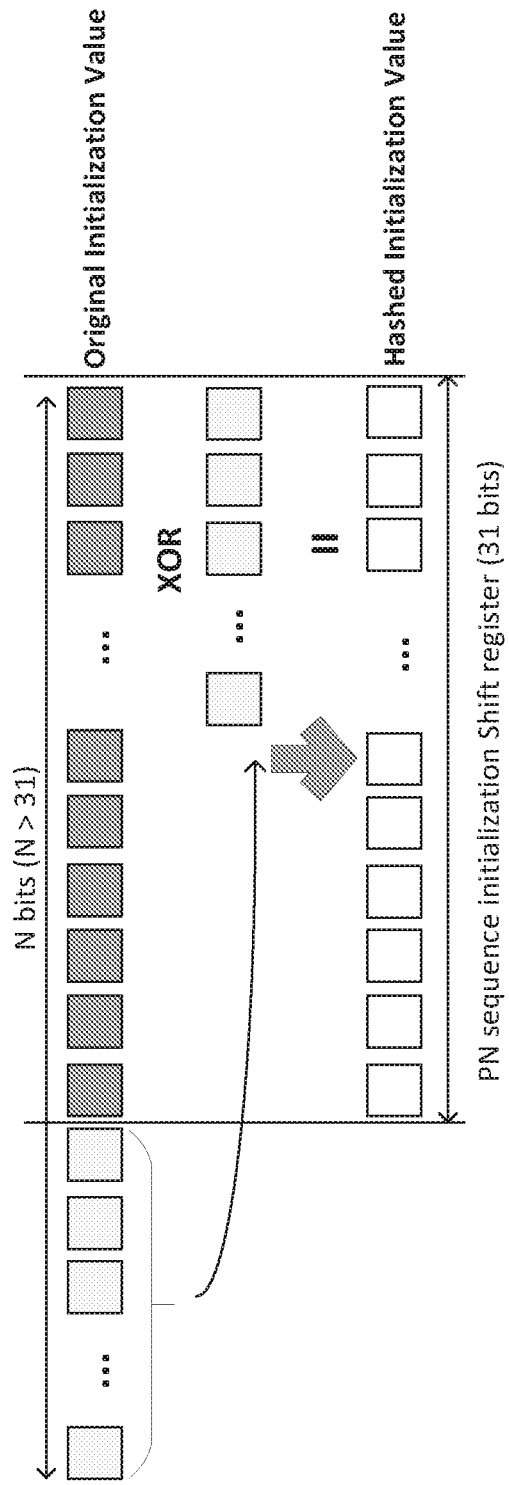
FIG. 5 illustrates yet another example initialization of a PN sequence according to some embodiments.

FIG. 5 illustrates an example of implementing, in a PN sequence initilization shift register of 31 bits, the cyclic wrap around function in the second way. As shown in FIG. 5, a bitwise XOR operation is performed on the value larger than $2^{31}$ which is down shifted by $2^{31}$ and the original initialization value composed of N bits (31<N<62) and the result of the bitwise XOR operation is taken as the final hashing output. The hashing function can be represented as:

$$b_k = \lfloor z/2^k \rfloor \bmod 2,$$

$$c_{init} = \sum_{k=0}^{30} ((b_k + b_{k-31}) \bmod 2) \cdot 2^k.$$

wherein "z" is the original initialization value, and $c_{init}$ is the final hashing output which will be used to initialize the second M-sequence of the PN sequence.

Yet another example of the hashing function is to take some function of the initialization parameters so as to obtain an original initialization value (which may exceed 31 bits) and perform modulo operation by a fixed number so as to limit the bit number of the original initialization value to a certain number.

As an example, consider the following formula (derived based on LTE CSI-RS Gold sequence initialization) for generating a 31-bit $c_{init}$ value for CSI-RS in NR systems using a hashing function of modulo operation, where the CSI-ID is the same as the cell-ID. In the following formula, one can limit the number of slots $n_s$ by taking modulo-$N_S$, where $N_S$ is in a set {10, 20, 32}.

$$N_{ID}^{cell} \Rightarrow N_{ID}^{CSI},$$

$$c_{init} = 2^{11} \cdot \underbrace{\frac{((14 \cdot ((n_s) \bmod N_S + 1) + l + 1) \cdot (2 \cdot N_{ID}^{cell} + 1))}{\sim 20 \text{ bits}}} + 2 \cdot \underbrace{\frac{N_{ID}^{cell}}{10 \text{ bits}}} + \underbrace{\frac{N_{CP}}{1 \text{ bit}}}.$$

One limitation of performing the modulo operation may be that the periodicity of the randomness would be limited by the choice of the "fixed number" used for performing the modulo operation. One way to get around this may be to perform another operation on the resulting initialization value to obtain a new initialization value. For instance, one can perform a cyclic shift of the resulting initialization value using some of the initialization parameters to obtain a new initialization value.

In a variant of the same hashing function, one can drop the cyclic prefix bit $N_{CP}$ and limit $N_S$=40. One limitation of this variant may be that the initialization value of the Gold sequence would repeat after $N_S$ slots (or 14*$N_S$ symbols). To extend the periodicity, a cyclic shift that is a function of the slot number may be applied to the $c_{init}$ after $N_S$ slots to get a new initialization value. For example, one can obtain a randomization of 10 ms for a sub-carrier spacing of 120 KHz by applying a cyclic shift of 15 bits to the $c_{init}$ obtained as above after $n_s$=40, e.g., $$N_{ID}^{cell} \Rightarrow N_{ID}^{CSI}$$

$$c_{init} = 2^{10} \cdot \frac{((14 \cdot ((n_s) \bmod N_S + 1) + l + 1) \cdot (2 \cdot N_{ID}^{cell} + 1))}{\sim 21 \text{ bits}} + \frac{N_{ID}^{cell}}{10 \text{ bits}},$$

for $n_s = 0, \ldots, 39$; and $c_{init}$ = Cyclic shift($c_{init}$, 15), for $n_s = 40, \ldots, 79$.

Yet another example of the hashing function is to apply a LTE PDCCH hashing function to a time-varying component $Y_k$, e.g., $$c_{init}=2^{11}(Y_{(14 \cdot (n_s+1)+l+1)}) \bmod 2^{20}+2 \cdot N_{ID}^{cell}+N_{CP},$$

$$Y_{k-1}=(A \cdot Y_k) \bmod D, A=39827,$$

$$Y_0=N_{ID}^{cell}, D=65537.$$

The time-varying component is generated using a linear congruential random number generator which is initialized by the cell-ID. The value of the time-varying component is generated by recursively generating a new pseudo random number.

Some embodiments may be to utilize two dimensions of the PN sequence, namely initializing the PN sequence and shifting the output sequence. In an embodiment, a part of the initialization parameters may be used to initialize the PN sequence and another part of the initialization parameters may be used to shift the output sequence.

Figure 6:
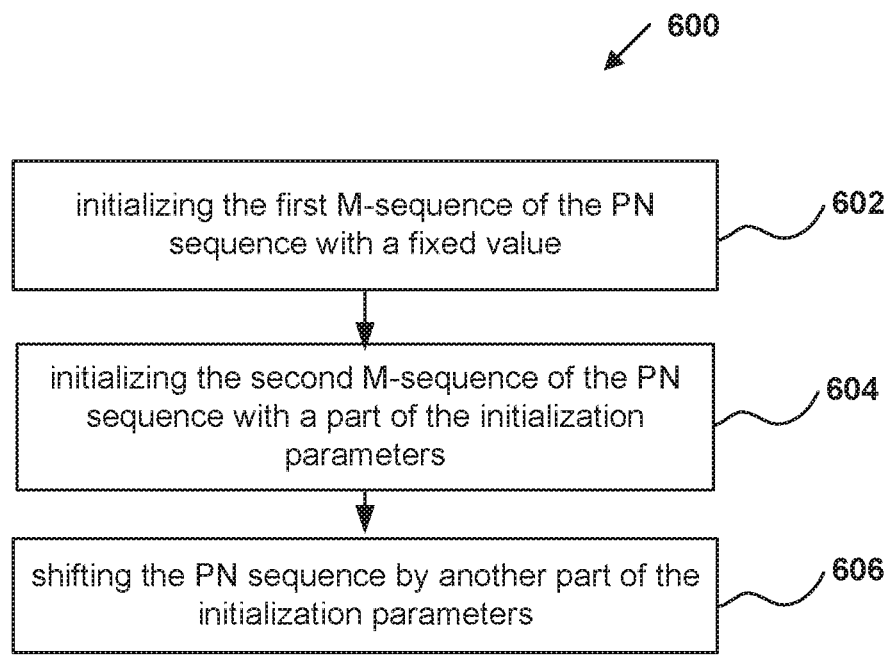
FIG. 6 illustrates yet another example operation flow/algorithmic structure of an apparatus according to some embodiments.

FIG. 6 illustrates an example operation flow/algorithmic structure 600 of an apparatus according to some embodiments.

Operation flow/algorithmic structure 600 may include, at 602, initializing the first M-sequence of the PN sequence with a fixed value.

Operation flow/algorithmic structure 600 may further include, at 604, initializing the second M-sequence of the PN sequence with a part of the initialization parameters.

Operation flow/algorithmic structure 200 may further include, at 606, shifting the PN sequence by another part of the initialization parameters.

There may be some jointly non-linear component of the original initialization value of the PN sequence to provide randomization between PN sequences generated with the initialization parameters. The multiplication factor in the LTE CRS sequence initialization, e.g., $(14*(n_s+1)+l+1)*(2N*_{ID}^{cell}+1)$, may be the jointly non-linear component. If one of the initialization parameters is used to shift the output sequence, then the jointly non-linear component may not be necessary.

In an embodiment, in order to make the cell-ID and the OFDM symbol index within a radio frame have a jointly non-linear combination in the initialization of the PN sequence, one of the parameters may be used to initialize the PN sequence and the other parameter may be used to perform a shift of the output sequence.

In an embodiment, if the initialization parameters may include the cell-ID, $N_{ID}^{cell}$, and the OFDM symbol index within the radio frame, e.g., $(14*(n_s+1)+l+1)$, the PN sequence may be initialized by the $N_{ID}^{cell}$, and the output sequence may be shifted by the OFDM symbol index within the radio frame. The output sequence becomes a function of both the cell-ID, $N_{ID}^{cell}$, and the OFDM symbol index within the radio frame, $14*n_s+l$. The PN sequence can be generated by the following equations:

$$c(n)=(x_0(n+N_c+N_s*m)+x_1(n+N_c+N_s*m)) \bmod 2;$$

$$x_0(n+31)=(x_0(n+3)+x_0(n)) \bmod 2;$$

$$x_1(n+31)=(x_1(n+3)+x_1(n+2)+x_1(n+1)+x_1(n)) \bmod 2;$$

$$x_0(0)=1, x_0(k)=0, k=1,2,\ldots,30;$$

$$x_1(k)=\lfloor c_{init}/2^k \rfloor \bmod 2, k=0,1,\ldots,30;$$

$$c_{init}=N_{ID}^{cell};$$

wherein c(n) is the PN sequence, $x_0$ is the first M-sequence, $x_1$ is the second M-sequence, $N_c$ is an initial offset, and in LTE it equals to 1600, $N_s$ is a shift unit, $m=14*n_s+l$, $n_s$ is a slot index, l is an OFDM symbol index, $c_{init}$ is the parameter component of the initialization value used to initialize the second M-sequence of the PN sequence, $N_{ID}^{cell}$ a cell-ID, $\lfloor \bullet \rfloor$ corresponds to the floor operation, and ($\bullet$) mod 2 corresponds to the modulo-2 operation.

In general, a Gold Sequence may be initialized by loading the first M-sequence with a fix initial value and loading the second M-sequence with the initialization parameters. Some embodiments of the present disclosure may be to utilize initialization parameters to initialize the first and second M-sequences of the PN sequence generator. This may allow using initialization parameters that would otherwise result in an initialization value of larger than 31 bits.

Figure 7:
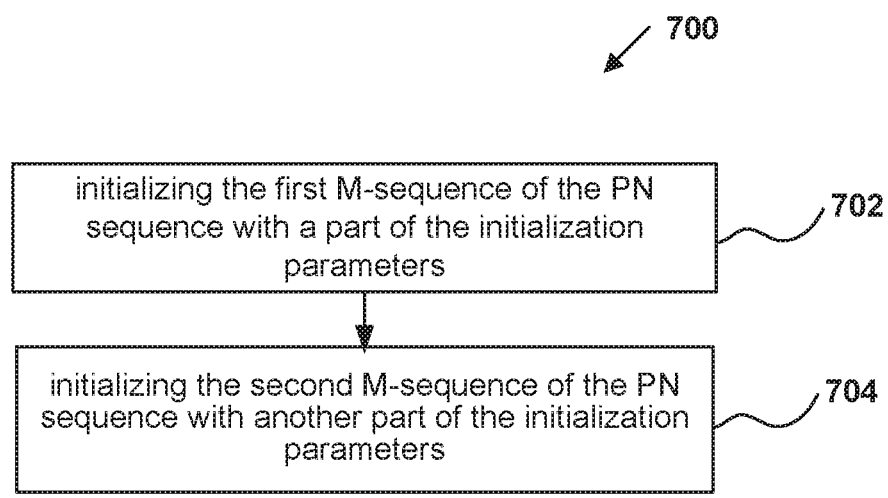
FIG. 7 illustrates yet another example operation flow/algorithmic structure of an apparatus according to some embodiments.

FIG. 7 illustrates an example operation flow/algorithmic structure 700 of an apparatus according to some embodiments.

Operation flow/algorithmic structure 700 may include, at 702, initializing the first M-sequence of the PN sequence with a part of the initialization parameters.

Operation flow/algorithmic structure 700 may further include, at 704, initializing the second M-sequence of the PN sequence with another part of the initialization parameters.

In an embodiment, the initialization parameter selection may be that a time-varying component of the original initialization value is used to initialize the first M-sequence, and a non-time-varying component of the original initialization value is used to initialize the second M-sequence. The time-varying component may potentially be a multiplication of the cell-ID and the OFDM symbol index within radio frame, e.g., $(14*(n_s+1)+l+1)*(2*N_{ID}^{cell}+1)$. The non-time-varying component may potentially be the cell-ID, the cyclic prefix indicator, or the subcarrier spacing.

In an embodiment, the initialization parameters may include the cell-ID, $N_{ID}^{cell}$, and the OFDM symbol index within the radio frame, e.g., $(14*(n_s+1)+l+1)$.

The first M-sequence of the PN sequence may be initialized by a parameter component which may be $(14*(n_s+1)+l+1)*(2*N_{ID}^{cell}+1)$ and the second M-sequence of the PN sequence may be initialized by $N_{ID}^{cell}$. The parameter component used to initialize the first M-sequence in this embodiment is a jointly non-linear component. This is because using the jointly non-linear component of a non-time-relative parameter and a time-relative parameter during the initialization process may ensure randomization between two PN sequences over different time instances.

In an embodiment, the PN sequence can be generated by the following equations:

$$c(n)=(x_0(n+N_c)+x_1(n+N_c)) \bmod 2,$$

$$x_0(n+31)=(x_0(n+3)+x_0(n)) \bmod 2,$$

$$x_1(n+31)=(x_1(n+3)+x_1(n+2)+x_1(n+1)+x_1(n)) \bmod 2,$$

$$x_0(0)=\lfloor c_{init,0}/2^k \rfloor, k=1,2,\ldots,30,$$

$$x_1(k)=\lfloor c_{init,1}/2^k \rfloor \bmod 2, k=0,1,\ldots,30,$$

$$c_{init,0}=(14*(n_s+1)+l+1)*(2*N_{ID}^{cell}+1),$$

$$c_{init,1}=N_{ID}^{cell} \text{ or } c_{init,1}=2*N_{ID}^{cell}+N_{CP} \text{ or } c_{init,1}=2*N_{ID}^{cell}+1, \text{ and}$$

wherein
c(n) is the PN sequence,
$x_0$ is the first M-sequence,
$x_1$ is the second M-sequence,
$N_c$ is an initial offset, and in LTE it equals to 1600,
$c_{init,0}$ is the time-varying component,
$c_{init,1}$ is the non-time-varying component,
$n_s$ is a slot index,
l is an OFDM symbol index,
$N_{CP}$ is a cyclic prefix bit,
$N_{ID}^{cell}$ is a cell-ID,
$\lfloor \bullet \rfloor$ corresponds to the floor operation, and
($\bullet$) mod 2 corresponds to the modulo-2 operation.

Figure 8:
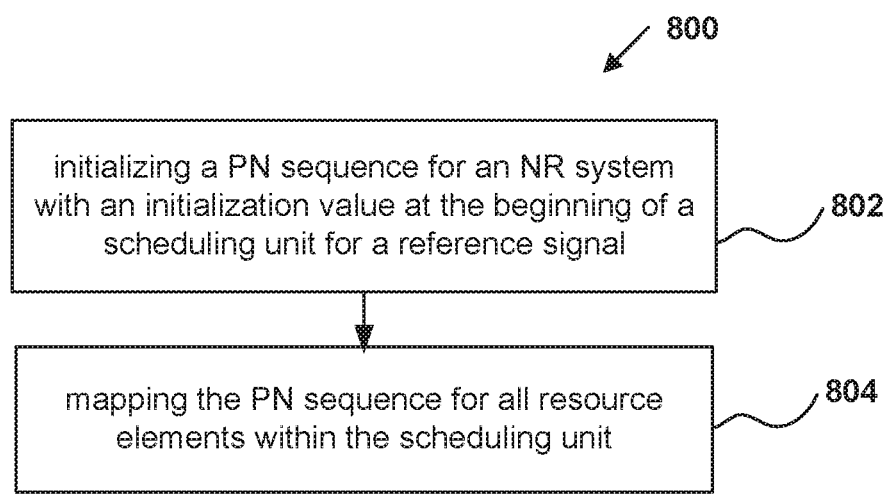
FIG. 8 illustrates yet another example operation flow/algorithmic structure of an apparatus according to some embodiments.

FIG. 8 illustrates an example operation flow/algorithmic structure 800 of an apparatus according to some embodiments.

Operation flow/algorithmic structure 800 may include, at 802, initializing a PN sequence for an NR system with an initialization value at the beginning of a scheduling unit for a reference signal, wherein the initialization value has a length smaller than or equal to that for initializing a corresponding PN sequence for LTE systems. In an embodiment, operation flow/algorithmic structure 800 may further include receiving the initialization value from a memory.

Operation flow/algorithmic structure 800 may further include, at 804, mapping the PN sequence for all resource elements within the scheduling unit.

In some embodiments, the initialization value for a PN sequence generator may be obtained by a UE at the start of each scheduling unit. The scheduling unit may be a slot, a mini slot or other reference signal resource unit.

In an embodiment, the initialization value of the PN sequence generator may depend on the slot index or the OFDM symbol index which corresponds to the scheduling unit.

In an embodiment, PN sequence offsets are used to indicate boundaries of scheduling units. For example, the UE may be configured with the PN sequence offsets to indicate the scheduling unit boundaries in the units of physical resource block relative to a wideband component carrier (CC) from a network's perspective.

In some embodiments, the PN sequence may be generated for all resource elements used for the corresponding reference signal transmission and may be mapped in a frequency-first or time-first order.

In an embodiment, the PN sequence may be mapped in a frequency-first and time-second order. For example, the mapping of the pseudo sequence may be performed in a frequency-first and time-second order, assuming reference signal transmission on all physical resource blocks of the wideband component carrier from a network's perspective.

In an embodiment, the PN sequence may be mapped in a time-first and frequency-second order. For example, the mapping of the pseudo sequence may be performed in a time-first and frequency-second order, assuming reference signal transmission on all physical resource blocks of the wideband component carrier from a network's perspective.

Figure 9A:
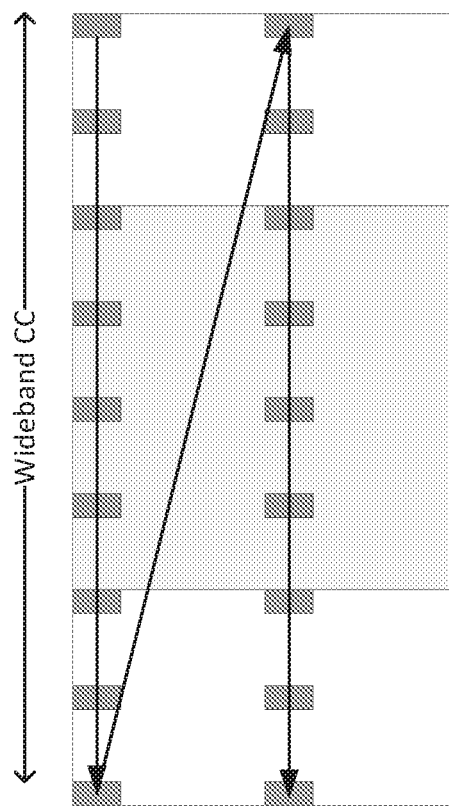
FIGS. 9A and 9B illustrate example generations of a PN sequence according to some embodiments, where.
Figure 9B:
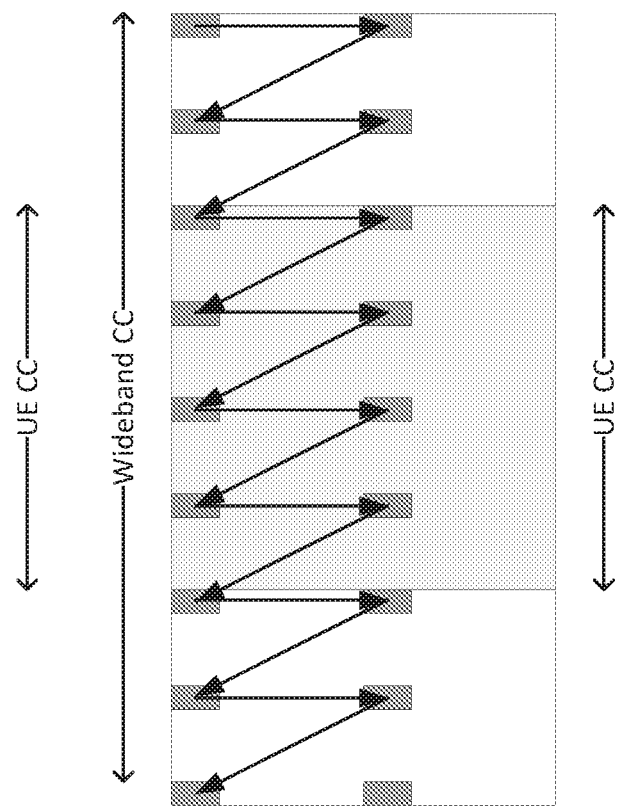

FIG. 9A and FIG. 9B illustrate examples of the PN sequence generation at the start of a slot for all reference signal resource elements (RE) in a slot with frequency-first mapping or with time-first mapping from a wideband carrier's perspective at the network side.

Figure 10:
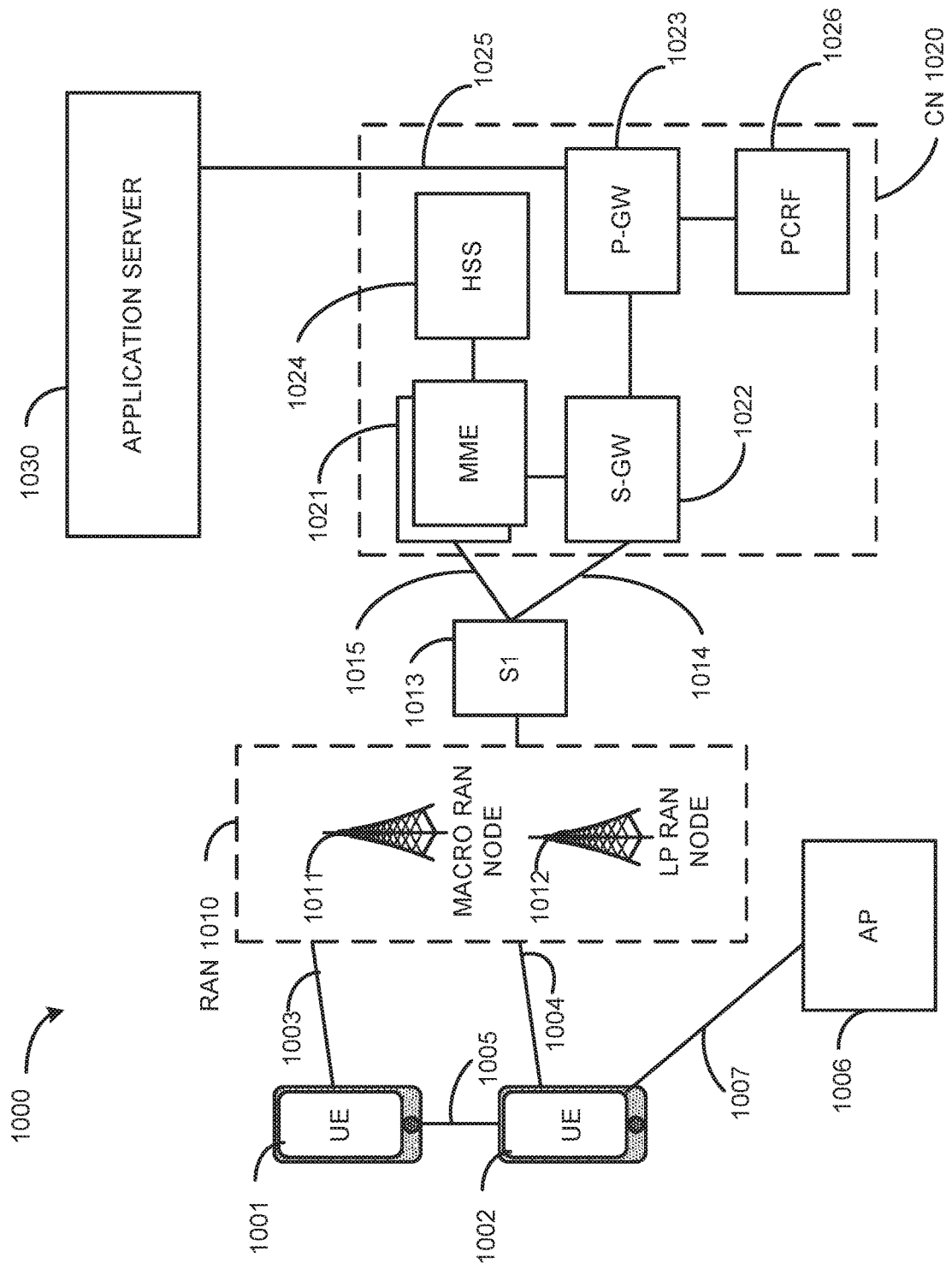
FIG. 10 illustrates an example architecture of a system of a network according to some embodiments.

FIG. 10 illustrates an example architecture of a system 1000 of a network in accordance with some embodiments. The system 1000 is shown to include a user equipment (UE) 1001 and a UE 1002. UE 1001 or UE 1002 may, for example, perform initialization and generation of PN sequences according to some embodiments. The UEs 1001 and 1002 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1001 and 1002 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 and 1002 may be configured to connect, e.g., communicatively couple, with a radio access network (RAN) 1010—the RAN 1010 may be, for example, an Evolved Universal Mobile Telecommunications System (UMTS) Terrestrial Radio Access Network (E-UTRAN), a NextGen RAN (NG RAN), or some other type of RAN. The UEs 1001 and 1002 utilize connections 1003 and 1004, respectively, each of which comprises a physical communications interface or layer (discussed in further detail below); in this example, the connections 1003 and 1004 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1001 and 1002 may further directly exchange communication data via a ProSe interface 1005. The ProSe interface 1005 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1002 is shown to be configured to access an access point (AP) 1006 via connection 1007. The connection 1007 can comprise a local wireless connection, such as a connection consistent with any IEEE 802.11 protocol, wherein the AP 1006 would comprise a wireless fidelity (WiFi®) router. In this example, the AP 1006 is shown to be connected to the Internet without connecting to the core network of the wireless system (described in further detail below).

The RAN 1010 can include one or more access nodes that enable the connections 1003 and 1004. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1010 may include one or more RAN nodes for providing macrocells, e.g., macro RAN node 1011, and one or more RAN nodes for providing femtocells or picocells (e.g., cells having smaller coverage areas, smaller user capacity, or higher bandwidth compared to macrocells), e.g., low power (LP) RAN node 1012.

Any of the RAN nodes 1011 and 1012 can terminate the air interface protocol and can be the first point of contact for the UEs 1001 and 1002. In some embodiments, any of the RAN nodes 1011 and 1012 can fulfill various logical functions for the RAN 1010 including, but not limited to, radio network controller (RNC) functions such as radio bearer management, uplink and downlink dynamic radio resource management and data packet scheduling, and mobility management. Any of the RAN nodes 1011 and 1012 may, for example, perform initialization and generation of PN sequences according to some embodiments.

In accordance with some embodiments, the UEs 1001 and 1002 can be configured to communicate using Orthogonal Frequency-Division Multiplexing (OFDM) communication signals with each other or with any of the RAN nodes 1011 and 1012 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 and 1012 to the UEs 1001 and 1002, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1001 and 1002. The physical downlink control channel (PDCCH) may carry information about the transport format and resource allocations related to the PDSCH channel, among other things. It may also inform the UEs 1001 and 1002 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1011 and 1012 based on channel quality information fed back from any of the UEs 1001 and 1002. The downlink resource assignment information may be sent on the PDCCH used for (e.g., assigned to) each of the UEs 1001 and 1002.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1010 is shown to be communicatively coupled to a core network (CN) 1020—via an S1 interface 1013. In embodiments, the CN 1020 may be an evolved packet core (EPC) network, a NextGen Packet Core (NPC) network, or some other type of CN. In this embodiment the S1 interface 1013 is split into two parts: the S1-U interface 1014, which carries traffic data between the RAN nodes 1011 and 1012 and the serving gateway (S-GW) 1022, and the S1-mobility management entity (MME) interface 1015, which is a signaling interface between the RAN nodes 1011 and 1012 and MMEs 1021.

In this embodiment, the CN 1020 comprises the MMEs 1021, the S-GW 1022, the Packet Data Network (PDN) Gateway (P-GW) 1023, and a home subscriber server (HSS) 1024. The MMEs 1021 may be similar in function to the control plane of legacy Serving General Packet Radio Service (GPRS) Support Nodes (SGSN). The MMEs 1021 may manage mobility aspects in access such as gateway selection and tracking area list management. The HSS 1024 may comprise a database for network users, including subscription-related information to support the network entities' handling of communication sessions. The CN 1020 may comprise one or several HSSs 1024, depending on the number of mobile subscribers, on the capacity of the equipment, on the organization of the network, etc. For example, the HSS 1024 can provide support for routing/roaming, authentication, authorization, naming/addressing resolution, location dependencies, etc.

The S-GW 1022 may terminate the S1 interface 1013 towards the RAN 1010, and route data packets between the RAN 1010 and the CN 1020. In addition, the S-GW 1022 may be a local mobility anchor point for inter-RAN node handovers and also may provide an anchor for inter-3GPP mobility. Other responsibilities may include lawful intercept, charging, and some policy enforcement.

The P-GW 1023 may terminate an SGi interface toward a PDN. The P-GW 1023 may route data packets between the EPC network and external networks such as a network including the application server 1030 (alternatively referred to as application function (AF)) via an Internet Protocol (IP) interface 1025. Generally, the application server 1030 may be an element offering applications that use IP bearer resources with the core network (e.g., UMTS Packet Services (PS) domain, LTE PS data services, etc.). In this embodiment, the P-GW 1023 is shown to be communicatively coupled to an application server 1030 via an IP communications interface 1025. The application server 1030 can also be configured to support one or more communication services (e.g., Voice-over-Internet Protocol (VoIP) sessions, PTT sessions, group communication sessions, social networking services, etc.) for the UEs 1001 and 1002 via the CN 1020.

The P-GW 1023 may further be a node for policy enforcement and charging data collection. Policy and Charging Enforcement Function (PCRF) 1026 is the policy and charging control element of the CN 1020. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1023. The application server 1030 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate traffic flow template (TFT) and QoS class of identifier (QCI), which commences the QoS and charging as specified by the application server 1030.

Figure 11:
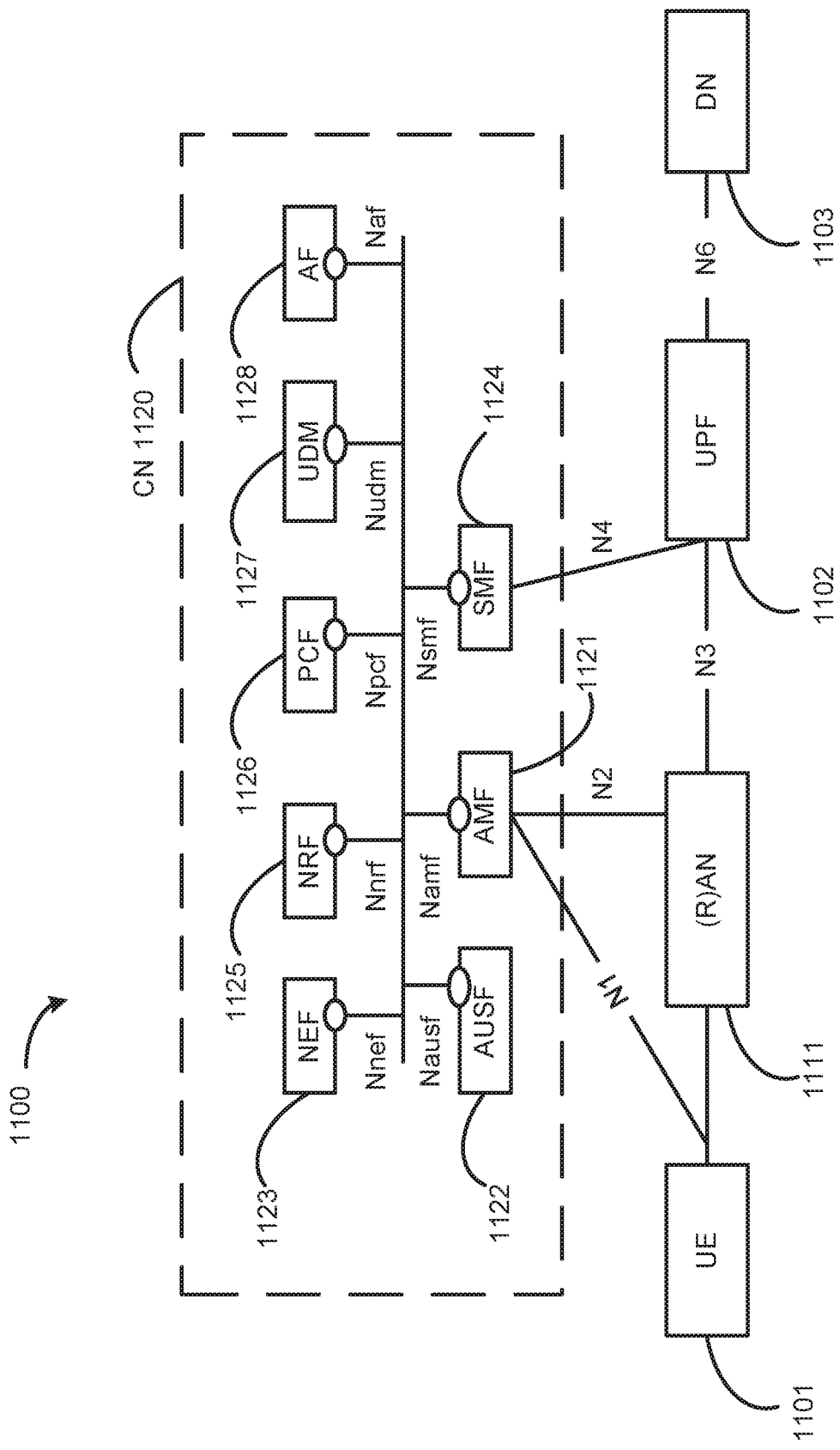
FIG. 11 illustrates another example architecture of a system of a network according to some embodiments.

FIG. 11 illustrates an example architecture of a system 1100 of a network in accordance with some embodiments. The system 1100 is shown to include a UE 1101, which may be the same or similar to UEs 1001 and 1002 discussed previously; a RAN node 1111, which may be the same or similar to RAN nodes 1011 and 1012 discussed previously; a User Plane Function (UPF) 1102; a Data network (DN) 1103, which may be, for example, operator services, Internet access or third party services; and a 5G Core Network (5GC or CN) 1120.

The CN 1120 may include an Authentication Server Function (AUSF) 1122; a Core Access and Mobility Management Function (AMF) 1121; a Session Management Function (SMF) 1124; a Network Exposure Function (NEF) 1123; a Policy Control Function (PCF) 1126; a Network Function (NF) Repository Function (NRF) 1125; a Unified Data Management (UDM) 1127; and an Application Function (AF) 1128. The CN 1120 may also include other elements that are not shown, such as a Structured Data Storage network function (SDSF), an Unstructured Data Storage network function (UDSF), and the like.

The UPF 1102 may act as an anchor point for intra-RAT and inter-RAT mobility, an external PDU session point of interconnect to DN 1103, and a branching point to support multi-homed PDU session. The UPF 1102 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 1102 may include an uplink classifier to support routing traffic flows to a data network. The DN 1103 may represent various network operator services, Internet access, or third party services. The DN 1103 may include, or be similar to application server 1030 discussed previously.

The AUSF 1122 may store data for authentication of UE 1101 and handle authentication related functionality, which facilitates a common authentication framework for various access types.

The AMF 1121 may be responsible for registration management (e.g., for registering UE 1101, etc.), connection management, reachability management, mobility management, and lawful interception of AMF-related events, and access authentication and authorization. AMF 1121 may provide transport for SM messages between and SMF 1124, and act as a transparent proxy for routing SM messages. AMF 1121 may also provide transport for short message service (SMS) messages between UE 1101 and an SMS function (SMSF) (not shown by FIG. 11). AMF 1121 may act as Security Anchor Function (SEA), which may include interaction with the AUSF 1122 and the UE 1101, receipt of an intermediate key that was established as a result of the UE 1101 authentication process. Where USIM based authentication is used, the AMF 1121 may retrieve the security material from the AUSF 1122. AMF 1121 may also include a Security Context Management (SCM) function, which receives a key from the SEA that it uses to derive access-network specific keys. Furthermore, AMF 1121 may be a termination point of RAN CP interface (N2 reference point), a termination point of NAS (N1) signalling, and perform NAS ciphering and integrity protection.

AMF 1121 may also support NAS signalling with a UE 1101 over an N3 interworking-function (IWF) interface. The N3IWF may be used to provide access to untrusted entities. N3IWF may be a termination point for the N2 and N3 interfaces for control plane and user plane, respectively, and as such, may handle N2 signalling from SMF and AMF for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N31WF may also relay uplink and downlink control-plane NAS (N1) signalling between the UE 1101 and AMF 1121, and relay uplink and downlink user-plane packets between the UE 1101 and UPF 1102. The N3IWF also provides mechanisms for IPsec tunnel establishment with the UE 1101.

The SMF 1124 may be responsible for session management (e.g., session establishment, modification and release, including tunnel maintaining between the UPF and the AN node); UE IP address allocation & management (including optional Authorization); Selection and control of the UPF function; configuration of traffic steering at the UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determination of the SSC mode of a session. The SMF 1124 may include the following roaming functionality: handle local enforcement to apply QoS SLAs (VPLMN); charging data collection and charging interface (VPLMN); lawful intercept (in VPLMN for SM events and interface to LI System); support for interaction with external DN for transport of signalling for PDU session authorization/authentication by external DN.

The NEF 1123 may provide means for securely exposing the services and capabilities provided by 3GPP network functions for third party, internal exposure/re-exposure, Application Functions (e.g., AF 1128), edge computing or fog computing systems, etc. In such embodiments, the NEF 1123 may authenticate, authorize, and/or throttle the AFs. NEF 1123 may also translate information exchanged with the AF 1128 and information exchanged with internal network functions. For example, the NEF 1123 may translate between an AF-Service-Identifier and internal 5GC information. NEF 1123 may also receive information from other network functions (NFs) based on exposed capabilities of other network functions. This information may be stored at the NEF 1123 as structured data, or at a data storage NF using a standardized interfaces. The stored information can then be re-exposed by the NEF 1123 to other NFs and AFs, and/or used for other purposes such as analytics.

The NRF 1125 may support service discovery functions, receive NF Discovery Requests from NF instances, and provide the information of the discovered NF instances to the NF instances. NRF 1125 also maintains information of available NF instances and their supported services.

The PCF 1126 may provide policy rules to control plane function(s) to enforce them, and may also support unified policy framework to govern network behaviour. The PCF 1126 may also implement a front end (FE) to access subscription information relevant for policy decisions in a UDR of UDM 1127.

The UDM 1127 may handle subscription-related information to support the network entities' handling of communication sessions, and may store subscription data of UE 1101. The UDM 1127 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 1126. UDM 1127 may also support SMS management, wherein an SMS-FE implements the similar application logic as discussed previously.

The AF 1128 may provide application influence on traffic routing, access to the Network Capability Exposure (NCE), and interact with the policy framework for policy control. The NCE may be a mechanism that allows the 5GC and AF 1128 to provide information to each other via NEF 1123, which may be used for edge computing implementations. In such implementations, the network operator and third party services may be hosted close to the UE 1101 access point of attachment to achieve an efficient service delivery through the reduced end-to-end latency and load on the transport network. For edge computing implementations, the 5GC may select a UPF 1102 close to the UE 1101 and execute traffic steering from the UPF 1102 to DN 1103 via the N6 interface. This may be based on the UE subscription data, UE location, and information provided by the AF 1128. In this way, the AF 1128 may influence UPF (re)selection and traffic routing. Based on operator deployment, when AF 1128 is considered to be a trusted entity, the network operator may permit AF 1128 to interact directly with relevant NFs.

As discussed previously, the CN 1120 may include an SMSF, which may be responsible for SMS subscription checking and verification, and relaying SM messages to/from the UE 1101 to/from other entities, such as an SMS-GMSC/IWMSC/SMS-router. The SMS may also interact with AMF 1121 and UDM 1127 for notification procedure that the UE 1101 is available for SMS transfer (e.g., set a UE not reachable flag, and notifying UDM 1127 when UE 1101 is available for SMS).

The system 1100 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 1100 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an N5 reference point may be between the PCF and the AF; an N7 reference point may be between the PCF and the SMF; an N11 reference point between the AMF and SMF; etc. In some embodiments, the CN 1120 may include an Nx interface, which is an inter-CN interface between the MME (e.g., MME 1021) and the AMF 1121 in order to enable interworking between CN 1120 and CN 1020.

Although not shown by FIG. 11, system 1100 may include multiple RAN nodes 1111 wherein an Xn interface is defined between two or more RAN nodes 1111 (e.g., gNBs and the like) that connecting to 5GC 1120, between a RAN node 1111 (e.g., gNB) connecting to 5GC 1120 and an eNB (e.g., a RAN node 1011 of FIG. 10), and/or between two eNBs connecting to 5GC 1120.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1101 in a connected mode (e.g., CM-CONNECTED) including functionality to manage the UE mobility for connected mode between one or more RAN nodes 1111. The mobility support may include context transfer from an old (source) serving RAN node 1111 to new (target) serving RAN node 1111; and control of user plane tunnels between old (source) serving RAN node 1111 to new (target) serving RAN node 1111.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 12:
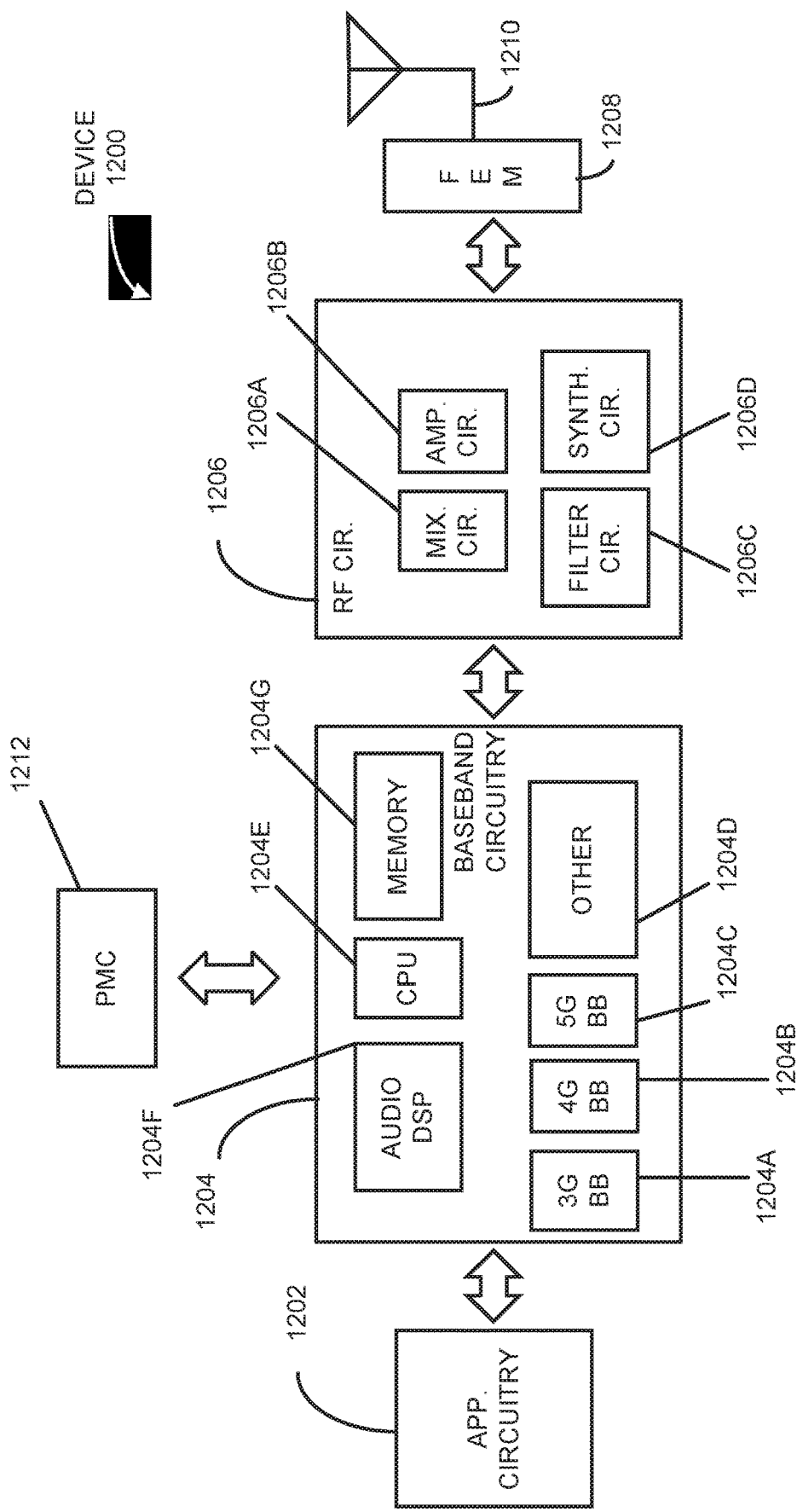
FIG. 12 illustrates example components of a device according to some embodiments.

FIG. 12 illustrates example components of a device 1200 in accordance with some embodiments. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include less elements (e.g., a RAN node may not utilize application circuitry 1202, and instead include a processor/controller to process IP data received from an EPC). In some embodiments, the device 1200 may include additional elements such as, for example, a memory/storage, a display, a camera, a sensor, or an input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include a memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband processing circuity 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of baseband processors 1204A-D) may handle various radio control functions that enable communication with one or more radio networks via the RF circuitry 1206. In other embodiments, some or all of the functionality of baseband processors 1204A-D may be included in modules stored in the memory 1204G and executed via a Central Processing Unit (CPU) 1204E. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP) 1204F. The audio DSP(s) 1204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206A, amplifier circuitry 1206B and filter circuitry 1206C. In some embodiments, the transmit signal path of the RF circuitry 1206 may include filter circuitry 1206C and mixer circuitry 1206A. RF circuitry 1206 may also include synthesizer circuitry 1206D for synthesizing a frequency for use by the mixer circuitry 1206A of the receive signal path and the transmit signal path. In some embodiments, the mixer circuitry 1206A of the receive signal path may be configured to down-convert RF signals received from the FEM circuitry 1208 based on the synthesized frequency provided by synthesizer circuitry 1206D. The amplifier circuitry 1206B may be configured to amplify the down-converted signals and the filter circuitry 1206C may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, the mixer circuitry 1206A of the receive signal path may comprise passive mixers, although the scope of the embodiments is not limited in this respect.

In some embodiments, the mixer circuitry 1206A of the transmit signal path may be configured to up-convert input baseband signals based on the synthesized frequency provided by the synthesizer circuitry 1206D to generate RF output signals for the FEM circuitry 1208. The baseband signals may be provided by the baseband circuitry 1204 and may be filtered by the filter circuitry 1206C.

In some embodiments, the mixer circuitry 1206A of the receive signal path and the mixer circuitry 1206A of the transmit signal path may include two or more mixers and may be arranged for quadrature downconversion and upconversion, respectively. In some embodiments, the mixer circuitry 1206A of the receive signal path and the mixer circuitry 1206A of the transmit signal path may include two or more mixers and may be arranged for image rejection (e.g., Hartley image rejection). In some embodiments, the mixer circuitry 1206A of the receive signal path and the mixer circuitry 1206A may be arranged for direct downconversion and direct upconversion, respectively. In some embodiments, the mixer circuitry 1206A of the receive signal path and the mixer circuitry 1206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206D may be a fractional-P synthesizer or a fractional P/P+1 synthesizer, although the scope of the embodiments is not limited in this respect as other types of frequency synthesizers may be suitable. For example, synthesizer circuitry 1206D may be a delta-sigma synthesizer, a frequency multiplier, or a synthesizer comprising a phase-locked loop with a frequency divider.

The synthesizer circuitry 1206D may be configured to synthesize an output frequency for use by the mixer circuitry 1206A of the RF circuitry 1206 based on a frequency input and a divider control input. In some embodiments, the synthesizer circuitry 1206D may be a fractional P/P+1 synthesizer.

In some embodiments, frequency input may be provided by a voltage controlled oscillator (VCO), although that is not a requirement. Divider control input may be provided by either the baseband circuitry 1204 or the applications processor 1202 depending on the desired output frequency. In some embodiments, a divider control input (e.g., P) may be determined from a look-up table based on a channel indicated by the applications processor 1202.

Synthesizer circuitry 1206D of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either P or P+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM 1208, or in both the RF circuitry 1206 and the FEM 1208.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device is included in a UE. The PMC 1212 may increase the power conversion efficiency while providing desirable implementation size and heat dissipation characteristics.

FIG. 12 shows the PMC 1212 coupled only with the baseband circuitry 1204. However, in other embodiments, the PMC 1212 may be additionally or alternatively coupled with, and perform similar power management operations for, other components such as, but not limited to, application circuitry 1202, RF circuitry 1206, or FEM 1208.

In some embodiments, the PMC 1212 may control, or otherwise be part of, various power saving mechanisms of the device 1200. For example, if the device 1200 is in an RRC_Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used execute Layer 3, Layer 2, or Layer 1 functionality, while processors of the application circuitry 1204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
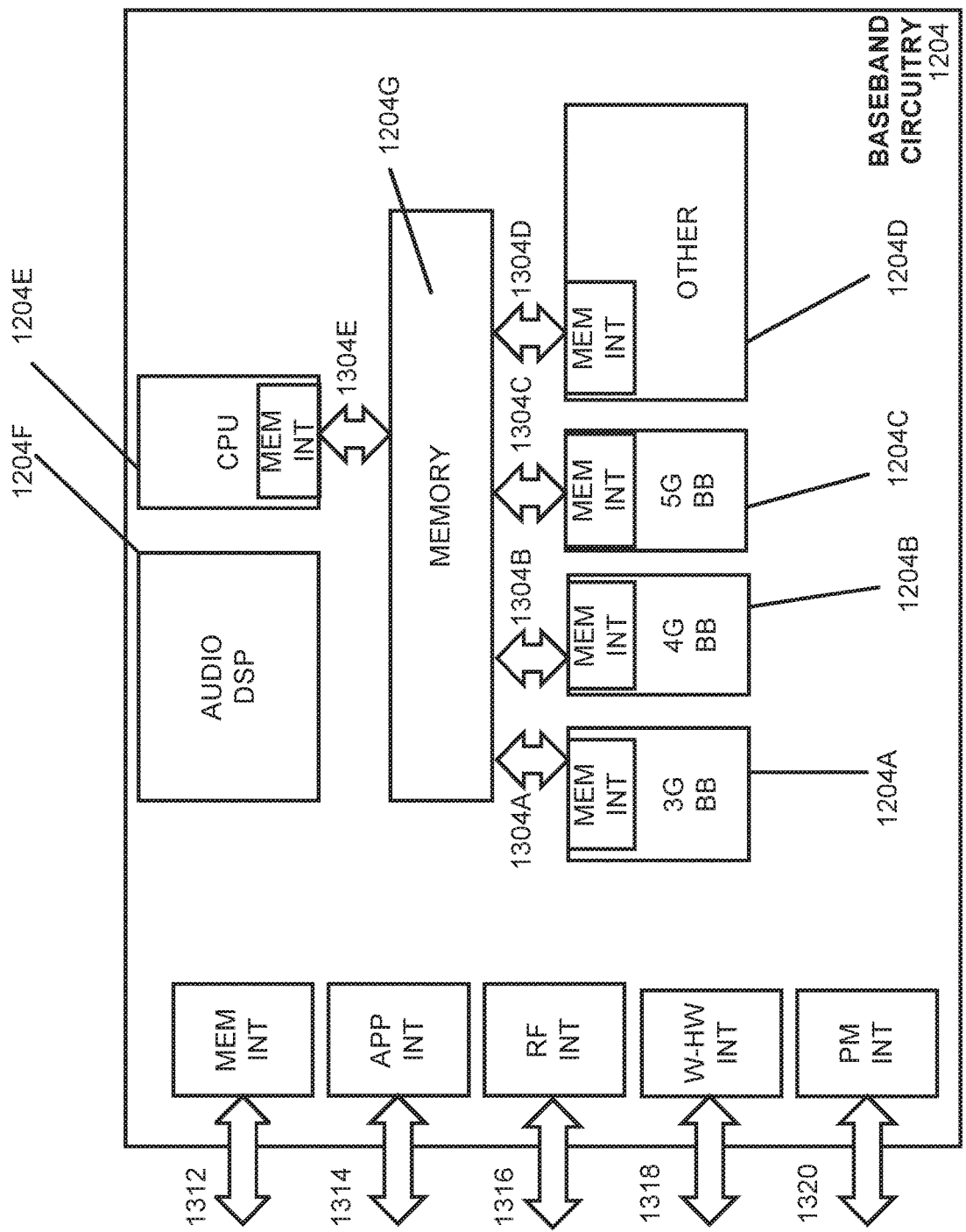
FIG. 13 illustrates example interfaces of baseband circuitry according to some embodiments.

FIG. 13 illustrates example interfaces of baseband circuitry in accordance with some embodiments. As discussed above, the baseband circuitry 1204 of FIG. 12 may comprise processors 1204A-1204E and a memory 1204G utilized by said processors. Each of the processors 1204A-1204E may include a memory interface, 1304A-1304E, respectively, to send/receive data to/from the memory 1204G.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212.

Figure 14:
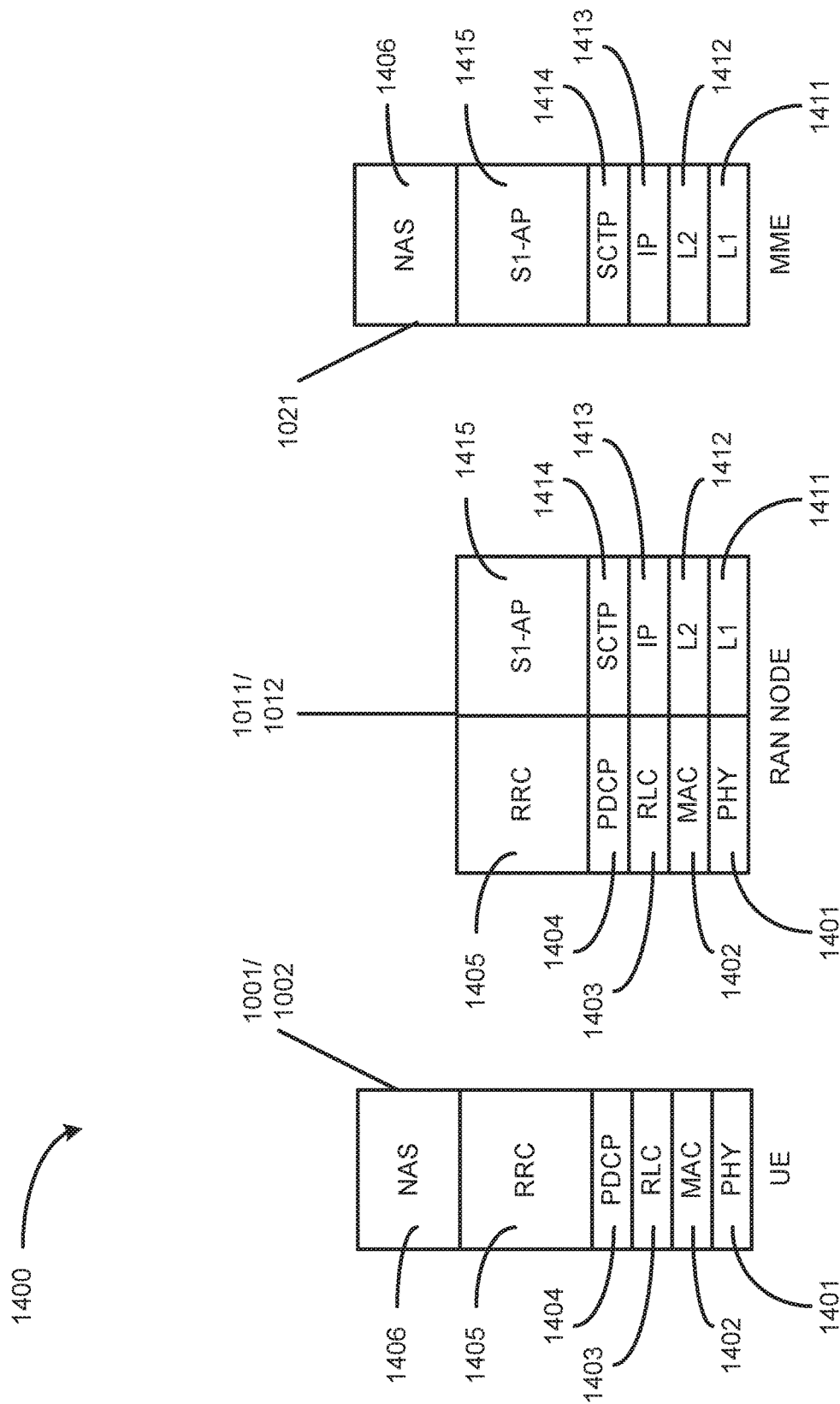
FIG. 14 illustrates an example control plane protocol stack according to some embodiments.

FIG. 14 is an example illustration of a control plane protocol stack in accordance with some embodiments. In this embodiment, a control plane 1400 is shown as a communications protocol stack between the UE 1001 (or alternatively, the UE 1002), the RAN node 1011 (or alternatively, the RAN node 1012), and the MME 1021.

The PHY layer 1401 may transmit or receive information used by the MAC layer 1402 over one or more air interfaces. The PHY layer 1401 may further perform link adaptation or adaptive modulation and coding (AMC), power control, cell search (e.g., for initial synchronization and handover purposes), and other measurements used by higher layers, such as the RRC layer 1405. The PHY layer 1401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1403 may operate in a plurality of modes of operation, including: Transparent Mode (TM), Unacknowledged Mode (UM), and Acknowledged Mode (AM). The RLC layer 1403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1001 and the RAN node 1011 may utilize a Uu interface (e.g., an LTE-Uu interface) to exchange control plane data via a protocol stack comprising the PHY layer 1401, the MAC layer 1402, the RLC layer 1403, the PDCP layer 1404, and the RRC layer 1405.

The non-access stratum (NAS) protocols 1406 form the highest stratum of the control plane between the UE 1001 and the MME 1021. The NAS protocols 1406 support the mobility of the UE 1001 and the session management procedures to establish and maintain IP connectivity between the UE 1001 and the P-GW 1023.

The S1 Application Protocol (S1-AP) layer 1415 may support the functions of the S1 interface and comprise Elementary Procedures (EPs). An EP is a unit of interaction between the RAN node 1011 and the CN 1020. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1414 may ensure reliable delivery of signaling messages between the RAN node 1011 and the MME 1021 based, in part, on the IP protocol, supported by the IP layer 1413. The L2 layer 1412 and the L1 layer 1411 may refer to communication links (e.g., wired or wireless) used by the RAN node and the MME to exchange information.

The RAN node 1011 and the MME 1021 may utilize an S1-MME interface to exchange control plane data via a protocol stack comprising the L1 layer 1411, the L2 layer 1412, the IP layer 1413, the SCTP layer 1414, and the S1-AP layer 1415.

Figure 15:
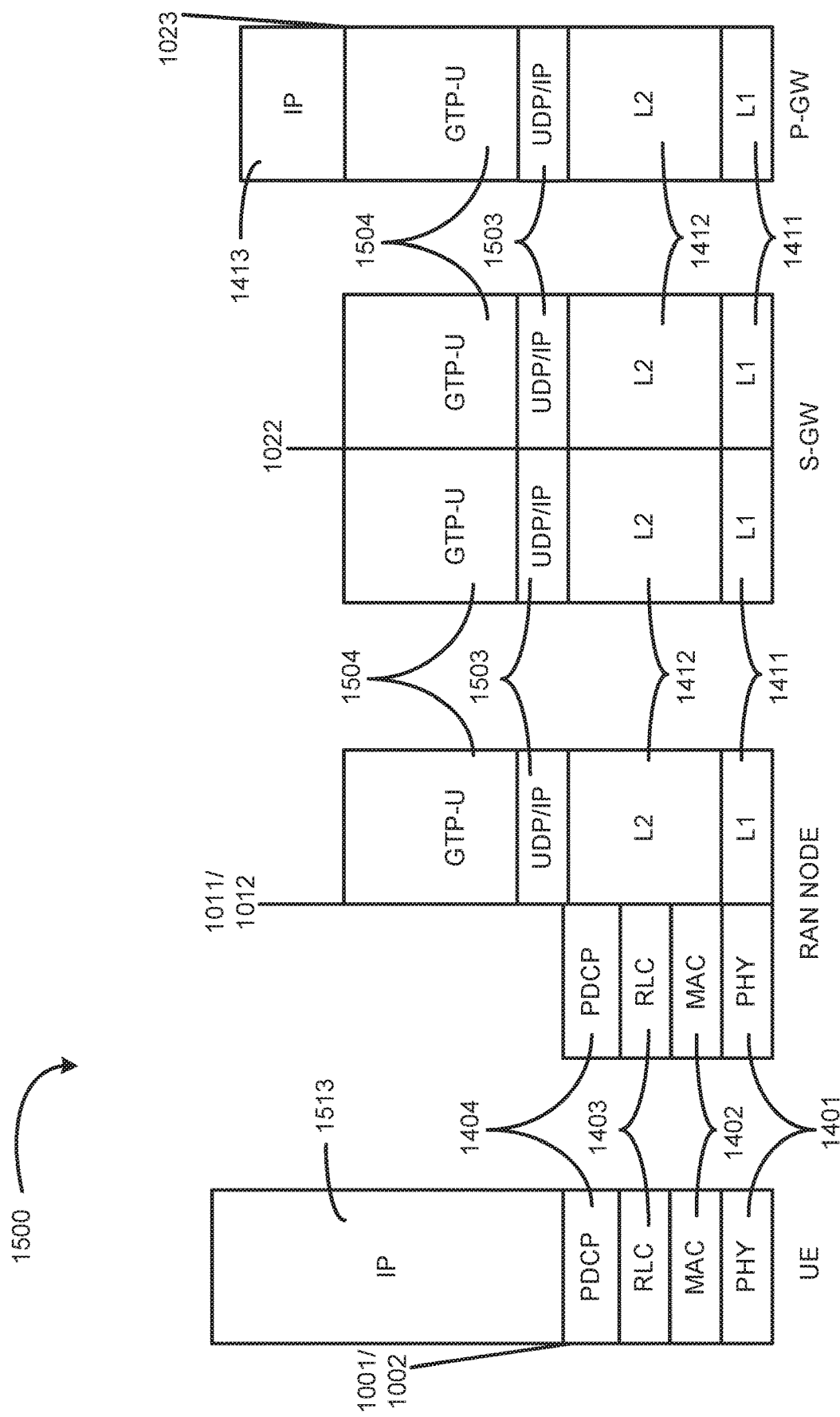
FIG. 15 illustrates an example user plane protocol stack according to some embodiments.

FIG. 15 is an example illustration of a user plane protocol stack in accordance with some embodiments. In this embodiment, a user plane 1500 is shown as a communications protocol stack between the UE 1001 (or alternatively, the UE 1002), the RAN node 1011 (or alternatively, the RAN node 1012), the S-GW 1022, and the P-GW 1023. The user plane 1500 may utilize at least some of the same protocol layers as the control plane 1400. For example, the UE 1001 and the RAN node 1011 may utilize a Uu interface (e.g., an LTE-Uu interface) to exchange user plane data via a protocol stack comprising the PHY layer 1401, the MAC layer 1402, the RLC layer 1403, the PDCP layer 1404.

The General Packet Radio Service (GPRS) Tunneling Protocol for the user plane (GTP-U) layer 1504 may be used for carrying user data within the GPRS core network and between the radio access network and the core network. The user data transported can be packets in any of IPv4, IPv6, or PPP formats, for example. The UDP and IP security (UDP/IP) layer 1503 may provide checksums for data integrity, port numbers for addressing different functions at the source and destination, and encryption and authentication on the selected data flows. The RAN node 1011 and the S-GW 1022 may utilize an S1-U interface to exchange user plane data via a protocol stack comprising the L1 layer 1411, the L2 layer 1412, the UDP/IP layer 1503, and the GTP-U layer 1504. The S-GW 1022 and the P-GW 1023 may utilize an S5/S8a interface to exchange user plane data via a protocol stack comprising the L1 layer 1411, the L2 layer 1412, the UDP/IP layer 1503, and the GTP-U layer 1504. As discussed above with respect to FIG. 14, NAS protocols support the mobility of the UE 1001 and the session management procedures to establish and maintain IP connectivity between the UE 1001 and the P-GW 1023.

Figure 16:
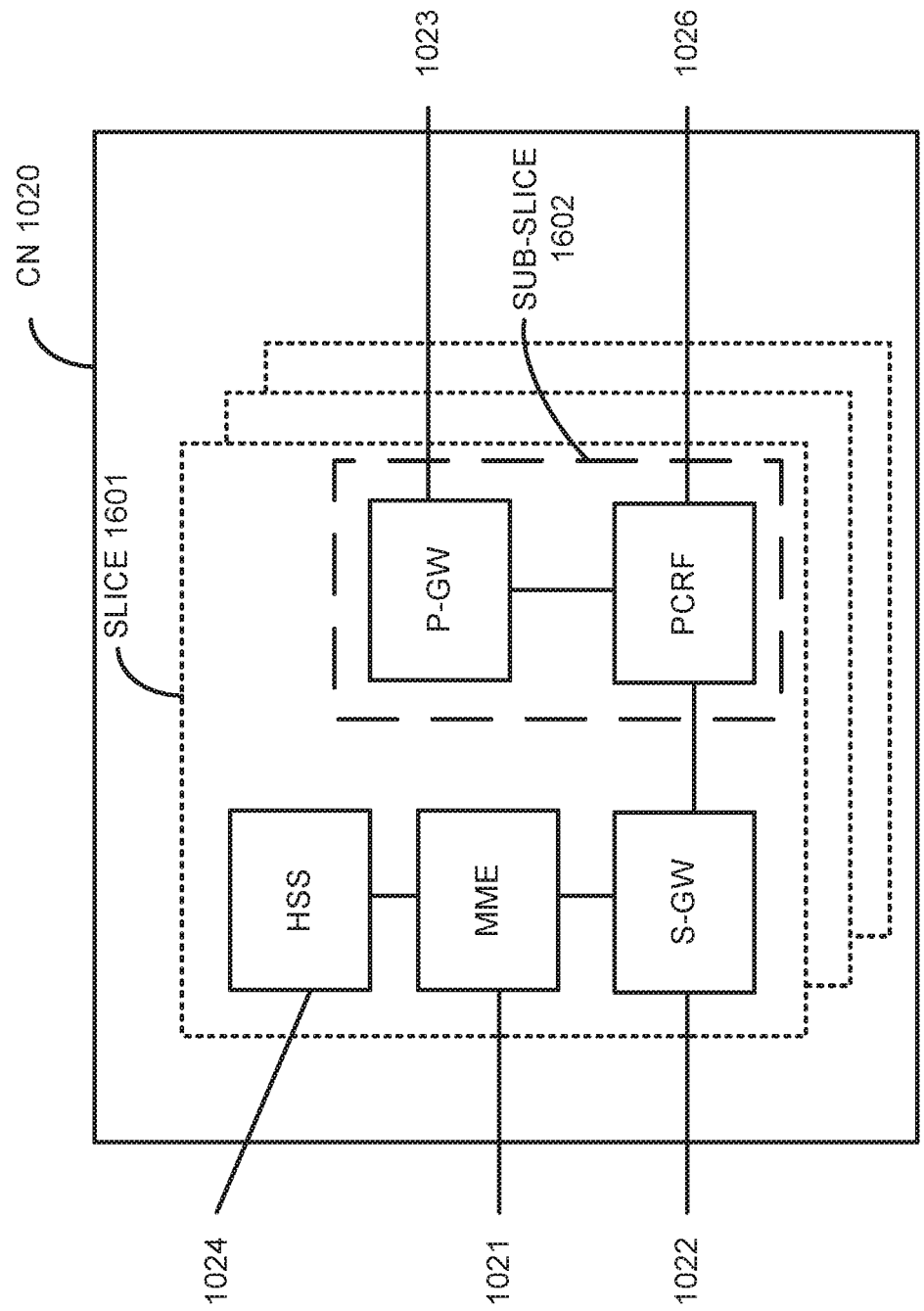
FIG. 16 illustrates example components of a core network according to some embodiments.

FIG. 16 illustrates example components of a core network in accordance with some embodiments. The components of the CN 1020 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 1020 may be referred to as a network slice 1601. A logical instantiation of a portion of the CN 1020 may be referred to as a network sub-slice 1602 (e.g., the network sub-slice 1602 is shown to include the PGW 1023 and the PCRF 1026).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 17:
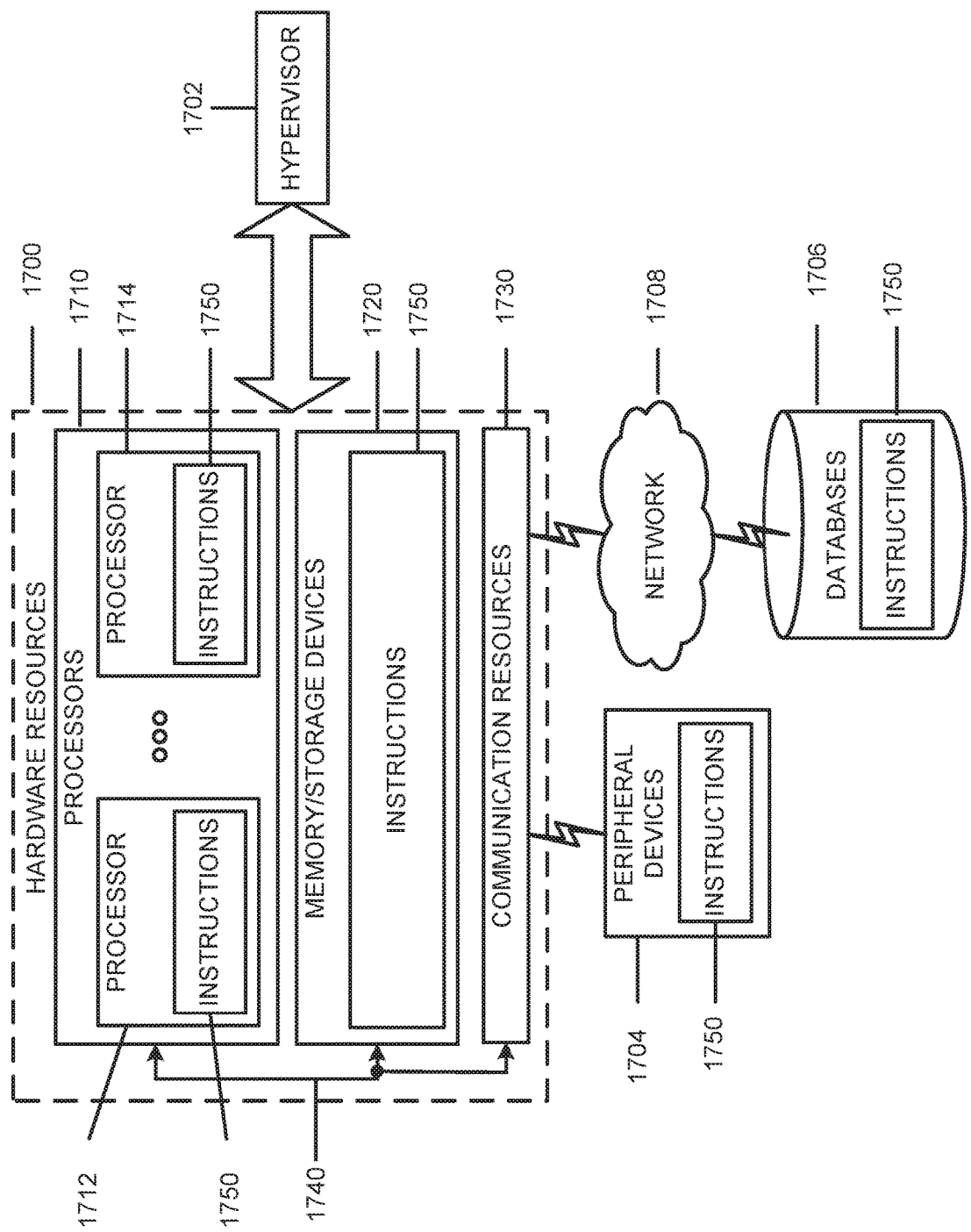
FIG. 17 is a block diagram illustrating example components according to some embodiments.

FIG. 17 is a block diagram illustrating example components, according to some example embodiments, able to read instructions from a machine-readable or computer-readable medium (e.g., a non-transitory machine-readable storage medium) and perform any one or more of the methodologies discussed herein. Specifically, FIG. 17 shows an example diagrammatic representation of hardware resources 1700 including one or more processors (or processor cores) 1710, one or more memory/storage devices 1720, and one or more communication resources 1730, each of which may be communicatively coupled via a bus 1740. For embodiments where node virtualization (e.g., NFV) is utilized, a hypervisor 1702 may be executed to provide an execution environment for one or more network slices/sub-slices to utilize the hardware resources 1700.

The processors 1710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1712 and a processor 1714. The processors 1710 may, for example, perform initialization of PN sequences according to some embodiments.

The memory/storage devices 1720 may include main memory, disk storage, or any suitable combination thereof. The memory/storage devices 1720 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1730 may include interconnection or network interface components or other suitable devices to communicate with one or more peripheral devices 1704 or one or more databases 1706 via a network 1708. For example, the communication resources 1730 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1750 may comprise software, a program, an application, an applet, an app, or other executable code for causing at least any of the processors 1710 to perform any one or more of the methodologies discussed herein. The instructions 1750 may reside, completely or partially, within at least one of the processors 1710 (e.g., within the processor's cache memory), the memory/storage devices 1720, or any suitable combination thereof. Furthermore, any portion of the instructions 1750 may be transferred to the hardware resources 1700 from any combination of the peripheral devices 1704 or the databases 1706. Accordingly, the memory of processors 1710, the memory/storage devices 1720, the peripheral devices 1704, and the databases 1706 are examples of computer-readable and machine-readable media.

In some embodiments, the components of FIG. 12 and FIG. 17, and particularly the baseband circuitry of FIG. 13, may be to perform one or more processes, techniques, or methods as described herein, or portions thereof.

In some embodiments, the electronic device(s), network(s), system(s), chip(s) or component(s), or portions or implementations thereof, of FIG. 12, FIG. 17, or some other figure herein may be configured to perform one or more processes, techniques, or methods as described herein, or portions thereof.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

Some non-limiting examples are provided below.

EXAMPLES

Example 1 may include an apparatus configured to initialize a pseudo noise (PN) sequence to be used in a New Radio (NR) system, comprising: processing circuitry to: generate, based on two distinct primitive polynomials, the PN sequence, wherein the PN sequence is defined by a first maximum length sequence (M-sequence) and a second M-sequence; obtain a final initialization value at least based on initialization parameters, wherein the final initialization value has a length smaller than or equal to that for initializing a corresponding PN sequence to be used in a Long-Term Evolution (LTE) system; and initialize the PN sequence based on the final initialization value; and interface circuitry, coupled with the processing circuitry, to receive the two distinct primitive polynomials and the initialization parameters from a memory.

Example 2 may include the apparatus of Example 1 or some other example herein, wherein the processing circuitry is configured to transform an original initialization value into a compressed value, wherein the original initialization value is derived based on the initialization parameters and has a length larger than that for initializing a corresponding PN sequence to be used in the LTE system.

Example 3 may include the apparatus of Example 2 or some other example herein, wherein the processing circuitry is configured to initialize the first M-sequence of the PN sequence with a fixed value; and initialize the second M-sequence of the PN sequence with the compressed value.

Example 4 may include the apparatus of Example 3 or some other example herein, wherein the processing circuitry is configured to use a hashing function to transform the original initialization value into the compressed value.

Example 5 may include the apparatus of Example 4 or some other example herein, wherein the hashing function is a cyclic redundancy check (CRC) calculation and the compressed value is the CRC of the original initialization value.

Example 6 may include the apparatus of Example 4 or some other example herein, wherein the hashing function is a cyclic wrap around function.

Example 7 may include the apparatus of Example 4 or some other example herein, wherein the hashing function is modulo operation.

Example 8 may include the apparatus of Example 1 or some other example herein, wherein the processing circuitry is configured to initialize the first M-sequence of the PN sequence with a fixed value; initialize the second M-sequence of the PN sequence with a part of the initialization parameters; and shift the PN sequence by another part of the initialization parameters.

Example 9 may include the apparatus of Example 1 or some other example herein, wherein the processing circuitry is configured to initialize the first M-sequence of the PN sequence with a part of the initialization parameters; and initialize the second M-sequence of the PN sequence with another part of the initialization parameters.

Example 10 may include the apparatus of Example 1 or some other example herein, wherein the PN sequence can be used to generate a reference signal or can be used for data scrambling and the reference signal can be a downlink reference signal or an uplink reference signal.

Example 11 may include an apparatus for a user equipment (UE), comprising: processing circuitry to: initialize a pseudo noise (PN) sequence for a New Radio (NR) system with an initialization value at the beginning of a scheduling unit for a reference signal, wherein the initialization value has a length smaller than or equal to that for initializing a corresponding PN sequence for a Long-Term Evolution (LTE) system; and map the PN sequence for all resource elements within the scheduling unit; and interface circuitry, coupled with the processing circuitry, to receive the initialization value from a memory.

Example 12 may include the apparatus of Example 11 or some other example herein, wherein the scheduling unit is a slot, a mini slot or other reference signal resource unit.

Example 13 may include the apparatus of Example 11 or some other example herein, wherein the processing circuitry is configured to map the PN sequence in a frequency-first or time-first order.

Example 14 may include a computer-readable medium having instructions that, when executed by one or more processors of an apparatus, cause the apparatus to: generate, based on two distinct primitive polynomials, a pseudo noise (PN) sequence to be used in a New Radio (NR) system, wherein the PN sequence is defined by a first maximum length sequence (M-sequence) and a second M-sequence; obtain a final initialization value at least based on initialization parameters, wherein the final initialization value has a length smaller than or equal to that for initializing a corresponding PN sequence to be used in a Long-Term Evolution (LTE) system; and initialize the PN sequence based on the final initialization value.

Example 15 may include the computer-readable medium of Example 14 or some other example herein, wherein the instructions, when executed, further cause the apparatus to transform an original initialization value into a compressed value, wherein the original initialization value is derived based on the initialization parameters and has a length larger than that for initializing a corresponding PN sequence to be used in the LTE system.

Example 16 may include the computer-readable medium of Example 15 or some other example herein, wherein the instructions, when executed, further cause the apparatus to: initialize the first M-sequence of the PN sequence with a fixed value; and initialize the second M-sequence of the PN sequence with the compressed value.

Example 17 may include the computer-readable medium of Example 16 or some other example herein, wherein the instructions, when executed, further cause the apparatus to use a hashing function to transform the original initialization value into the compressed value.

Example 18 may include the computer-readable medium of Example 17 or some other example herein, wherein the hashing function is a cyclic redundancy check (CRC) calculation and the compressed value is the CRC of the original initialization value.

Example 19 may include the computer-readable medium of Example 17 or some other example herein, wherein the hashing function is a cyclic wrap around function.

Example 20 may include the computer-readable medium of Example 17 or some other example herein, wherein the hashing function is modulo operation.

Example 21 may include the computer-readable medium of Example 14 or some other example herein, wherein the instructions, when executed, further cause the apparatus to: initialize the first M-sequence of the PN sequence with a fixed value; initialize the second M-sequence of the PN sequence with a part of the initialization parameters; and shift the PN sequence by another part of the initialization parameters.

Example 22 may include the computer-readable medium of Example 14 or some other example herein, wherein the instructions, when executed, further cause the apparatus to: initialize the first M-sequence of the PN sequence with a part of the initialization parameters; and initialize the second M-sequence of the PN sequence with another part of the initialization parameters.

Example 23 may include the computer-readable medium of Example 14 or some other example herein, wherein the PN sequence can be used to generate a reference signal or can be used for data scrambling and the reference signal can be a downlink reference signal or an uplink reference signal.

Example 24 may include a computer-readable medium having instructions that, when executed by one or more processors of a user equipment (UE), cause the UE to: initialize a pseudo noise (PN) sequence for a New Radio (NR) system with an initialization value at the beginning of a scheduling unit for a reference signal, wherein the initialization value has a length smaller than or equal to that for initializing a corresponding PN sequence for a Long-Term Evolution (LTE) system; and map the PN sequence for all resource elements within the scheduling unit.

Example 25 may include the computer-readable medium of Example 24 or some other example herein, wherein the scheduling unit is a slot, a mini slot or other reference signal resource unit.

Example 26 may include the computer-readable medium of Example 24 or some other example herein, wherein the instructions, when executed, further cause the UE to map the PN sequence in a frequency-first or time-first order.

Example 27 may include a method for initializing a pseudo noise (PN) sequence to be used in a New Radio (NR) system, comprising: generating, based on two distinct primitive polynomials, the PN sequence, wherein the PN sequence is defined by a first maximum length sequence (M-sequence) and a second M-sequence; obtaining a final initialization value at least based on initialization parameters, wherein the final initialization value has a length smaller than or equal to that for initializing a corresponding PN sequence to be used in a Long-Term Evolution (LTE) system; and initializing the PN sequence based on the final initialization value.

Example 28 may include the method of Example 27 or some other example herein, wherein an original initialization value is transformed into a compressed value, wherein the original initialization value is derived based on the initialization parameters and has a length larger than that for initializing a corresponding PN sequence to be used in the LTE system.

Example 29 may include the method of Example 28 or some other example herein, wherein the first M-sequence of the PN sequence is initialized with a fixed value; and the second M-sequence of the PN sequence is initialized with the compressed value.

Example 30 may include the method of Example 29 or some other example herein, wherein a hashing function is used to transform the original initialization value into the compressed value.

Example 31 may include the method of Example 30 or some other example herein, wherein the hashing function is a cyclic redundancy check (CRC) calculation and the compressed value is the CRC of the original initialization value.

Example 32 may include the method of Example 30 or some other example herein, wherein the hashing function is a cyclic wrap around function.

Example 33 may include the method of Example 30 or some other example herein, wherein the hashing function is modulo operation.

Example 34 may include the method of Example 27 or some other example herein, wherein the first M-sequence of the PN sequence is initialized with a fixed value; the second M-sequence of the PN sequence is initialized with a part of the initialization parameters; and the PN sequence is shifted by another part of the initialization parameters.

Example 35 may include the method of Example 27 or some other example herein, wherein the first M-sequence of the PN sequence is initialized with a part of the initialization parameters; and the second M-sequence of the PN sequence is initialized with another part of the initialization parameters.

Example 36 may include the method of Example 27 or some other example herein, wherein the PN sequence can be used to generate a reference signal or can be used for data scrambling and the reference signal can be a downlink reference signal or an uplink reference signal.

Example 37 may include a method for a user equipment (UE), comprising: initializing a pseudo noise (PN) sequence for a New Radio (NR) system with an initialization value at the beginning of a scheduling unit for a reference signal, wherein the initialization value has a length smaller than or equal to that for initializing a corresponding PN sequence for a Long-Term Evolution (LTE) system; and mapping the PN sequence for all resource elements within the scheduling unit.

Example 38 may include the method of Example 37 or some other example herein, wherein the scheduling unit is a slot, a mini slot or other reference signal resource unit.

Example 39 may include the method of Example 37 or some other example herein, wherein the PN sequence is mapped in a frequency-first or time-first order.

Example 40 may include an apparatus for a network node, comprising: processing circuitry to: initialize a pseudo noise (PN) sequence for a New Radio (NR) system with an initialization value at the beginning of a scheduling unit for a reference signal, wherein the initialization value has a length smaller than or equal to that for initializing a corresponding PN sequence for a Long-Term Evolution (LTE) system; and map the PN sequence for all resource elements within the scheduling unit; and interface circuitry, coupled with the processing circuitry, to receive the initialization value from a memory.

Example 41 may include the apparatus of Example 40 or some other example herein, wherein the scheduling unit is a slot, a mini slot or other reference signal resource unit.

Example 42 may include the apparatus of Example 40 or some other example herein, wherein the processing circuitry is configured to map the PN sequence in a frequency-first or time-first order.

Example 43 may include a computer-readable medium having instructions that, when executed by one or more processors of a network node, cause the network node to: initialize a pseudo noise (PN) sequence for a New Radio (NR) system with an initialization value at the beginning of a scheduling unit for a reference signal, wherein the initialization value has a length smaller than or equal to that for initializing a corresponding PN sequence for a Long-Term Evolution (LTE) system; and map the PN sequence for all resource elements within the scheduling unit.

Example 44 may include the computer-readable medium of Example 43 or some other example herein, wherein the scheduling unit is a slot, a mini slot or other reference signal resource unit.

Example 45 may include the computer-readable medium of Example 44 or some other example herein, wherein the instructions, when executed, further cause the network node to map the PN sequence in a frequency-first or time-first order.

Example 46 may include a method for a network node, comprising:
  initializing a pseudo noise (PN) sequence for a New Radio (NR) system with an initialization value at the beginning of a scheduling unit for a reference signal, wherein the initialization value has a length smaller than or equal to that for initializing a corresponding PN sequence for a Long-Term Evolution (LTE) system; and mapping the PN sequence for all resource elements within the scheduling unit.

Example 47 may include the method of Example 46 or some other example herein, wherein the scheduling unit is a slot, a mini slot or other reference signal resource unit.

Example 48 may include the method of Example 46 or some other example herein, wherein the PN sequence is mapped in a frequency-first or time-first order.

Example 49 may include an apparatus comprising means to perform one or more elements of a method described in or related to any of Examples 27-39 and 46-48, or any other method or process described herein.

Example 50 may include an apparatus comprising logic, modules, or circuitry to perform one or more elements of a method described in or related to any of Examples 27-39 and 46-48, or any other method or process described herein.

Example 51 may include a method, technique, or process as described in or related to any of Examples 27-39 and 46-48, or portions or parts thereof.

Example 52 may include an apparatus comprising: one or more processors and one or more computer readable media comprising instructions that, when executed by the one or more processors, cause the one or more processors to perform the method, techniques, or process as described in or related to any of Examples 27-39 and 46-48, or portions thereof.

Example 53 may include a signal as described in or related to any of Examples 1-52, or portions or parts thereof.

Example 54 may include a signal in a wireless network as shown and described herein.

Example 55 may include a method of communicating in a wireless network as shown and described herein.

Example 56 may include a system for providing wireless communication as shown and described herein.

Example 57 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An apparatus configured to initialize a pseudo noise (PN) sequence to be used in a New Radio (NR) system, comprising:
processing circuitry configured to:
generate, based on two distinct primitive polynomials, the PN sequence, wherein the PN sequence is defined by a first maximum length sequence (M-sequence) and a second M- sequence;
obtain a final initialization value at least based on initialization parameters, wherein the final initialization value has a length smaller than an original initialization value;
transform the original initialization value into a compressed value, wherein the original initialization value is derived based on the initialization parameters and has a length larger than that for initializing a corresponding PN sequence to be used in the Long-Term Evolution (LTE) system; and
initialize the PN sequence based on the final initialization value; and
interface circuitry, coupled with the processing circuitry, and configured to receive the two distinct primitive polynomials and the initialization parameters from a memory.

2. The apparatus of claim 1, wherein the processing circuitry is configured to:
initialize the first M-sequence of the PN sequence with a fixed value; and
initialize the second M-sequence of the PN sequence with the compressed value.

3. The apparatus of claim 2, wherein the processing circuitry is configured to use a hashing function to transform the original initialization value into the compressed value.

4. The apparatus of claim 3, wherein the hashing function is a cyclic redundancy check (CRC) calculation and the compressed value is the CRC of the original initialization value.

5. The apparatus of claim 3, wherein the hashing function is a cyclic wrap around function.

6. The apparatus of claim 3, wherein the hashing function is modulo operation.

7. The apparatus of claim 1, wherein the processing circuitry is configured to: initialize the first M-sequence of the PN sequence with a fixed value;
initialize the second M-sequence of the PN sequence with a part of the initialization parameters; and
shift the PN sequence by another part of the initialization parameters.

8. The apparatus of claim 1, wherein the processing circuitry is configured to: initialize the first M-sequence of the PN sequence with a part of the initialization parameters; and
initialize the second M-sequence of the PN sequence with another part of the initialization parameters.

9. The apparatus of claim 1, wherein the processing circuitry is configured to generate an uplink reference signal from the PN sequence or scramble data using the PN sequence.

10. An apparatus for a user equipment (UE) configured for operation in a 5G New Radio (NR) system, the apparatus comprising:
processing circuitry configured to:
initialize a pseudo noise (PN) sequence with an initialization value at the beginning of a scheduling unit for a reference signal for operating in the 5G NR system, wherein the initialization value has a length smaller than an original initialization value, wherein the original initialization value is derived based on initialization parameters and has a length larger than that for initializing a corresponding PN sequence to be used in a Long-Term Evolution (LTE) system; and
map the PN sequence for all resource elements used for the corresponding reference signal transmission within the scheduling unit; and
interface circuitry, coupled with the processing circuitry, and configured to receive the initialization value from a memory.

11. The apparatus of claim 3, wherein the scheduling unit is a slot, a mini slot or other reference signal resource unit.

12. The apparatus of claim 3, wherein the processing circuitry is configured to map the PN sequence in a frequency-first or time-first order.

13. A computer-readable medium having instructions that, when executed by one or more processors of an apparatus, cause the apparatus to:
generate, based on two distinct primitive polynomials, a pseudo noise (PN) sequence to be used in a New Radio (NR) system, wherein the PN sequence is defined by a first maximum length sequence (M-sequence) and a second M-sequence;
obtain a final initialization value at least based on initialization parameters, wherein the final initialization value has a length smaller than an original initialization value;
transform the original initialization value into a compressed value, wherein the original initialization value is derived based on the initialization parameters and has a length larger than that for initializing a corresponding PN sequence to be used in the Long-Term Evolution (LTE) system; and
initialize the PN sequence based on the final initialization value, wherein the one or more processors are configured to:
initialize the first M-sequence of the PN sequence with a fixed value;
initialize the second M-sequence of the PN sequence with a part of the initialization parameters; and
shift the PN sequence by another part of the initialization parameters.

14. The computer-readable medium of claim 13, wherein the instructions, when executed, further cause the apparatus to transform an original initialization value into a compressed value, wherein the original initialization value is derived based on the initialization parameters and has a length larger than that for initializing a corresponding PN sequence to be used in the LTE system.

15. The computer-readable medium of claim 14 wherein the instructions, when executed, further cause the apparatus to:
initialize the first M-sequence of the PN sequence with a fixed value; and
initialize the second M-sequence of the PN sequence with the compressed value.

16. The computer-readable medium of claim 15, wherein the instructions, when executed, further cause the apparatus to use a hashing function to transform the original initialization value into the compressed value.

17. The computer-readable medium of claim 16, wherein the hashing function is a cyclic redundancy check (CRC) calculation and the compressed value is the CRC of the original initialization value.

18. The computer-readable medium of claim 16, wherein the hashing function is a cyclic wrap around function.

19. The computer-readable medium of claim 16, wherein the hashing function is modulo operation.

20. The computer-readable medium of claim 13, wherein the one or more processors are configured to use the PN sequence to generate an uplink reference signal or to scramble data.

21. A computer-readable medium having instructions that, when executed by one or more processors of a user equipment (UE), configure the tiE for operation in a 5G New Radio (NR) system, wherein the one or more processors are configured to:
- initialize a pseudo noise (PN) sequence with an initialization value at the beginning of a scheduling unit for a reference signal for operating in the 5G NR system, wherein the initialization value has a length smaller than an original initialization value, wherein the original initialization value is derived based on initialization parameters and has a length larger than that for initializing a corresponding PN sequence to be used in a Long-Term Evolution (LTE) system; and
- map the PN sequence for all resource elements used for the corresponding; reference signal transmission within the scheduling unit.

22. The computer-readable medium of claim 21 wherein the scheduling unit is a slot, a mini slot or other reference signal resource unit.

23. The computer-readable medium of claim 21, wherein the instructions, when executed, further cause the UE to map the PN sequence in a frequency-first or time-first order.

\* \* \* \* \*